United States Patent [19]

Haneda et al.

[11] Patent Number: 5,870,713
[45] Date of Patent: Feb. 9, 1999

[54] INFORMATION PROCESSOR

[75] Inventors: Isamu Haneda, Soraku-gun; Toshio Isoe, Tenri, both of Japan

[73] Assignee: Sharp Kabushiki Kaisha, Osaka, Japan

[21] Appl. No.: 831,324

[22] Filed: Apr. 1, 1997

[30] Foreign Application Priority Data

Apr. 22, 1996 [JP] Japan ................................. 8-100051

[51] Int. Cl.⁶ ................................................. G06F 19/00
[52] U.S. Cl. ................ 705/9; 705/7; 705/8; 364/705.08; 364/400; 368/10; 368/41; 345/156; 345/173; 379/100.3
[58] Field of Search .................. 705/7, 8, 9; 364/705.08, 364/400; 368/41, 10; 345/173, 156; 379/100.03

[56] References Cited

U.S. PATENT DOCUMENTS

| 4,774,697 | 9/1988 | Aihara | 368/41 |
|---|---|---|---|
| 4,847,760 | 7/1989 | Yagi | 364/400 |
| 4,890,258 | 12/1989 | Tsugei et al. | 364/705.08 |
| 5,133,610 | 7/1992 | Sukigara | 400/54 |
| 5,214,622 | 5/1993 | Nemoto et al. | 368/10 |
| 5,220,540 | 6/1993 | Nishida et al. | 368/41 |
| 5,587,724 | 12/1996 | Matsuda | 345/156 |
| 5,644,339 | 7/1997 | Mori et al. | 345/173 |
| 5,644,722 | 7/1997 | Miyamoto et al. | 705/9 |
| 5,719,924 | 2/1998 | Haneda et al. | 379/100.03 |

FOREIGN PATENT DOCUMENTS 4-137066  12/1992  Japan ............................. G06F 15/21

*Primary Examiner*—Allen R. MacDonald
*Assistant Examiner*—M. Irshadullah
*Attorney, Agent, or Firm*—Nixon & Vanderhye, P.C.

[57] ABSTRACT

An information processor having a scheduling function according to the present invention includes an input device, a memory for storing elementary item schedules, a RTC for generating time and date information, a CPU for detection for detecting a predetermined period based on the time and the date information generated by the RTC, a display for automatically displaying a list of the elementary item schedules stored in the memory at every predetermined period detected by the CPU for detection, and a selecting device for selecting a desired schedule from the list of the elementary item schedules displayed by the display device.

8 Claims, 27 Drawing Sheets

|                      | 205                  | 203          | 202          |                    |
|----------------------|----------------------|--------------|--------------|--------------------|
| Schedule             | Elementary Item  Rturn | Switch  Terminate | Menu         | Function           |
| ✚ January 22 1996    | Display              |              | Calendar/    | Action list        |
| Time 1:00PM~3:00PM   | Register             |              | schedule     |                    |
| Place ; Third conference room | Delete       |              |              |                    |
| Contents  Conference for projecting new products | Paste |     | Telephone book | Hand- written memo- randum |
|                      | Elementary Item  ◆   |              |              |                    |
|                      | 204                  |              | Optical mail box | Print          |
|                      |                      |              | Optical communication Send | Receive |

Fig. 5 (a)

| Schedule             | Register    Terminate | Elementary Item list — 206 |
|----------------------|-----------------------|----------------------------|
| ✚ February 22 (Thur) 1996 |                  | Conference for pro- jecting new products |
| Time 1:00PM~3:00PM   |                       | Regular arrangement        |
| Place ; Third conference room |              | Data update                |
| Contents             |                       | Payment of rent            |
|                      |                       | Meeting for ex- changing information |
|                      |                       |                            |
|                      |                       | Optical mail box  Print    |
|                      |                       | Optical communication Send  Receive |

| Schedule | Register Terminate | Elementary Item list |
|---|---|---|
| ✚ February 29 (Thur) 1996 | | Conference for projecting new products |
| Time 1:00PM~3:00PM | | Regular arrangement |
| Place ; Third conference room | | Meeting for exchanging information |
| Contents | | Telephon book / Hand-witten memo-randum |
| | | Optical mail box / Print |
| | | Optical communication |
| | | Send / Receive |

| Schedule | Register Terminate | Elementary Item list |
|---|---|---|
| ✚ February 29 (Thur) 1996 | | Conference for projecting new products |
| Time 1:00PM~3:00PM | | Regular arrangement |
| Place ; Third conference room | | Meeting for exchanging Information |
| Contents | | Telephon book / Hand-witten memo-randum |
| | | Optical mail box / Print |
| | | Optical communication Send / Receive |

- 209
- 201

INFORMATION PROCESSOR

BACKGROUND OF THE INVENTION

1. Field of the Invention

The present invention relates to an information processor having a scheduling function which is applied to a portable information terminal, an electronic notebook, and the like.

2. Description of the Related Art

As an information processor having a scheduling function according to the prior art, for example, Japanese Unexamined Patent Publication No. Hei 4(1992)-137066 has proposed an apparatus for creating a schedule which reduces complexity in retrieving and copying inputted schedule items to be used when inputting similar schedule items.

In the above-mentioned apparatus for creating a schedule, schedule items used often are inputted and preliminarily registered. The schedule items which have preliminarily been registered are displayed on a screen when inputting similar schedule items. And the displayed items are selected so that a schedule can be created. Consequently, inputting similar schedule items repeatedly is not needed, so that the schedule can be created by simpler inputting operation.

However, the above-mentioned apparatus for creating a schedule does not have such a structure that regular schedules are automatically displayed when the regular schedules must be inputted. For this reason, a user forgets inputting a regular schedule at times.

In the case where the user forgets inputting the regular schedule, threre is no way to compensated it.

Furthermore, the user should always display elementary items of a regular schedule for each month and should retrieve and select, with eyes, the elementary items to be needed from all the elementary items of the registered schedules. For this reason, in the case where a lot of schedules are registered, a work of selecting the elementary items of the schedules is complicated.

SUMMARY OF THE INVENTION

The present invention provides an information processor having a scheduling function, comprising input means for inputting activation of the scheduling function, regular schedules for each month and the like, storing means for storing elementary item schedules (regular schedules), timing means for generating time and date information, detecting means for detecting a predetermined period based on the time and the date information generated by the timing means, display means for automatically displaying a list of the elementary item schedules stored by the storing means at every predetermined period detected by the detecting means, and selecting means for selecting a desired schedule from the list of the elementary item schedules displayed by the display means.

According to the present invention, the elementary item schedules are automatically displayed, for example, at the beginning of a month so that a user can be reminded of the need to input them every month even if the user does not remember to input them.

BRIEF DESCRIPTION OF THE DRAWINGS

FIG. 5 (*a*) and 5 (*b*) are diagrams showing examples of display screens according to the present invention;

FIG. 18 is a diagram showing an example of the display screen according to the present invention;

FIG. 27 is a diagram showing an example of the display screen according to the present invention;

DESCRIPTION OF PREFERRED EMBODIMENTS

Figure 1:
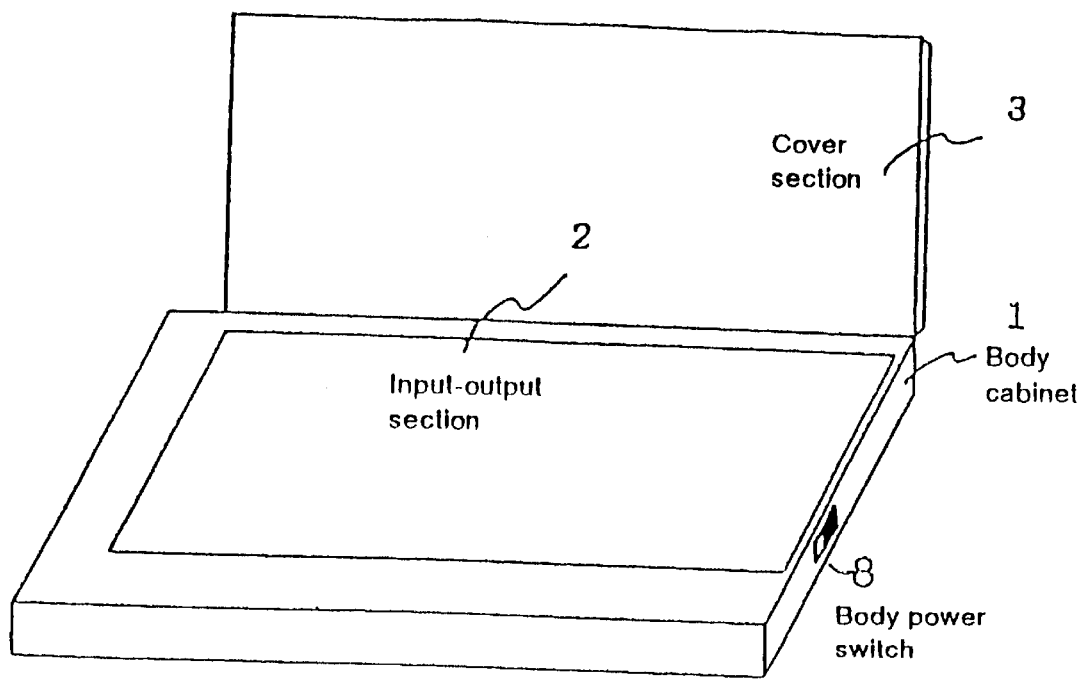
FIG. 1 is a perspective view showing an appearance of an information processor according to the present invention.

A first aspect of the present invention provides an information processor having a scheduling function, comprising input means for inputting activation of the scheduling function, regular schedules for each month and the like, storing means for storing elementary item schedules, timing means for generating time and date information, detecting means for detecting a predetermined period based on the time and the date information generated by the timing means, display means for automatically displaying a list of the elementary item schedules stored by the storing means at every predetermined period the beginning of the month detected by the detecting means, and selecting means for selecting a desired schedule from the list of the elementary item schedules displayed by the display means.

In the present invention, the storing means, the timing means and the detecting means are formed by a microcomputer comprising a CPU, a ROM, a RAM, and an I/O port. The storing means includes the ROM and the RAM of the microcomputer.

The display means comprises a liquid crystal display, a CRT display, a plasma display and the like.

The input means and the selecting means include a keyboard, a mouse, a pen tablet and the like.

According to the first aspect of the present invention, the elementary item schedules (regular schedules) are automatically displayed at the beginning of the month so that a user can be prevented from forgetting to input the regular schedules for each month even if the user is not conscious of inputting the regular schedules.

For example, five schedules of "Conference for projecting new products", "Regular arrangement", "Data update", "Payment of rent" and "Meeting for exchanging information" are registered as the elementary item schedules in January, respectively. When January ends and February comes, that is, a first day comes, a list of the five elementary item schedules registered last month is selectively displayed. Consequently, the elementary item schedules are automatically displayed at the beginning of the month even if the user is not conscious of input in order to prevent the user from forgetting to input the regular schedules for each month. Such an information processor is provided.

A second aspect of the present invention provides the information processor, further comprising setting means for setting a specific day, comparing means for comparing with the specific day set by the setting means the date information generated by the timing means, and display control means for receiving, from the comparing means, a result of comparison in which the date information is coincident with the specific day, and for controlling the display means so that the list of the elementary item schedules stored by the storing means is displayed so as to be selected.

According to the present invention, the comparing means and the display control means comprise the CPU of the microcomputer. The setting means comprises the keyboard, the mouse, the pen tablet and the like.

According to the second aspect of the present invention, the elementary item schedules are automatically displayed on the specific day set by the user even if the user is not conscious of inputting the regular schedules for each month. Consequently, the user can be prevented from forgetting to input the regular schedules for each month.

A third aspect of the present invention provides the information processor, further comprising power switching means for turning ON and OFF a power source, wherein the display control means further has a function of controlling the display means so that the list of the elementary item schedules stored by the storing means is displayed so as to be selected in response to power-ON performed by the power switching means.

The power switching means comprises an ON/OFF switch.

According to the third aspect of the present invention, when the power source is turned ON at the beginning of the month or on the specific day, for example, the elementary items of the regular schedules are automatically displayed. Consequently, the user can be prevented from forgetting to input the regular schedules.

A fourth aspect of the present invention provides the information processor, wherein the display control means further has a function of controlling the display means so that the list of the elementary item schedules stored by the storing means is displayed so as to be selected in response to activation of the scheduling function by the input means.

According to the fourth aspect of the present invention, when the scheduling function is activated at the beginning of the month or on the specific day, for example, the elementary item regular schedules are automatically displayed. Consequently, the user can be prevented from forgetting to input the regular schedules.

A fifth aspect of the present invention provides the information processor, further comprising temporary storing means for temporarily storing the elementary item schedules stored by the storing means, and deleting means for deleting the elementary item schedules selected by the selecting means from the temporary storing means, wherein the display control means further has a function of controlling the display means so that the list of elementary item schedules remaining in the temporary storing means is displayed so as to be selected.

The temporary storing means includes the RAM of the microcomputer.

According to the fifth aspect of the present invention, the elementary item schedules which have been selected are excluded to decrease the number of the elementary item schedules to be selected and a list thereof is displayed. Consequently, the user can easily input the elementary item schedules to be needed.

A sixth aspect of the present invention provides the information processor, wherein the deleting means further has a function of deleting, from the storing means, an elementary item schedule which has not been selected by the selecting means.

According to the sixth aspect of the present invention, an elementary item schedule which has not been selected before detecting the beginning of a next month, the specific day or the like are deleted, and a list thereof is displayed. Consequently, the user can easily input an elementary item schedule to be needed.

A seventh aspect of the present invention provides the information processor, wherein the display control means further has a function of controlling the display means so that an elementary item schedule which has not been selected by the selecting means is displayed on a first day of the same week as the set secific day or a final day of the week before.

According to the seventh aspect of the present invention, the unselected elementary item schedules are displayed again on a first day of the same week as the set specific day, or a final day of the week before. Consequently, the user can input the schedules which have not been set, and can be prevented from forgetting input operation.

An eighth aspect of the present invention provides the information processor, further comprising registering means for registering, in the storing means, the elementary item schedules selected by the selecting means. The registering means includes the CPU of the microcomputer.

According to the eighth aspect of the present invention, for example, the item schedules which have not been selected before detecting the beginning of the next month, the specific day or the like are deleted from the elementary items to decrease the number of the elementary item schedules to be inputted. Consequently, the user can easily input an elementary item schedule to be needed.

The present invention will be described below in detail with reference to the following drawings. The present invention is not restricted to the following embodiments. By taking, as an example, an information processor having a plurality of modes such as a calendar/schedule mode, a telephone book mode and the like, a scheduling function according to the present invention will be described below.

FIG. 1 is a perspective view showing an appearance of an information processor according to the present invention.

In FIG. 1, the information processor according to the present invention comprises a body cabinet section 1 and a cover section 3.

The body cabinet section 1 includes an input-output section 2 formed by integrating a display section and a transparent tablet, and an infrared communicating section, a pen holding section and the like which are not shown, and has a power source section and the like built therein, the power source section serving to supply power to a portion such as a control circuit for controlling the input-output section 2, the infrared communicating section, an interface and the like. In particular, the input-output section 2 will be described below in detail with reference to FIG. 2.

The cover section 3 is connected to a back of the body cabinet section 1 by a hinge, and turns so as to cover the input-output section 2 and to protect the inputoutput section 2 when carrying the information processor.

A body power switch 8 is provided on a side of the body cabinet section 1. The body power switch 8 is operated to turn ON and OFF a body power source.

Figure 2:
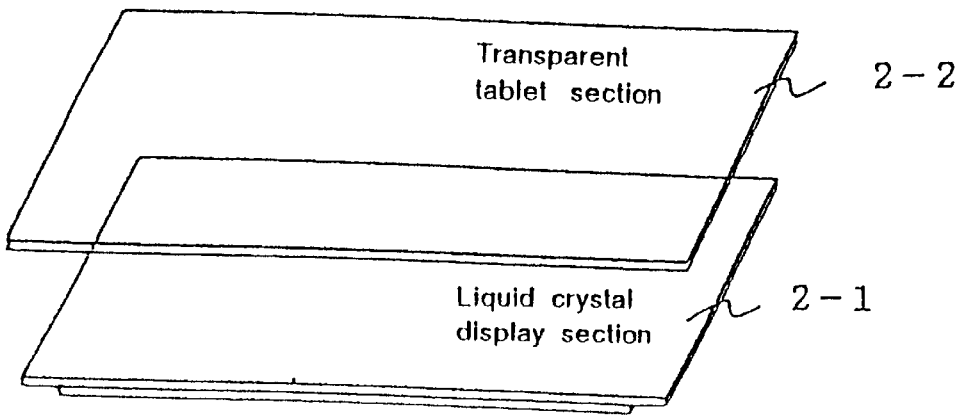
FIG. 2 is an exploded perspective view showing an input-output section according to the present invention.

FIG. 2 is an exploded perspective view showing the input-output section 2.

The input-output section 2 is formed by integrating a thin liquid crystal display section 2-1 using a matrix method capable of displaying characters and a transparent tablet 2-2 having such a size as to cover the liquid crystal display section 2-1. A back light comprising an EL panel or the like may be provided on a back of the liquid crystal display section 2-1 if necessary.

The transparent tablet 2-2 has transparent electrodes provided on inside faces of two transparent sheets. In normal state, small protruding spacers are regularly printed such that the transparent electrodes do not come in contact with each other, and the transparent electrodes are caused to come in contact with each other by giving an instruction by a finger or a pen so that a selected position is detected.

By synchronizing position information to the contents displayed by the liquid crystal display section 2-1, the position of the liquid crystal display section 2-1 selected by a user is detected.

Figure 3:
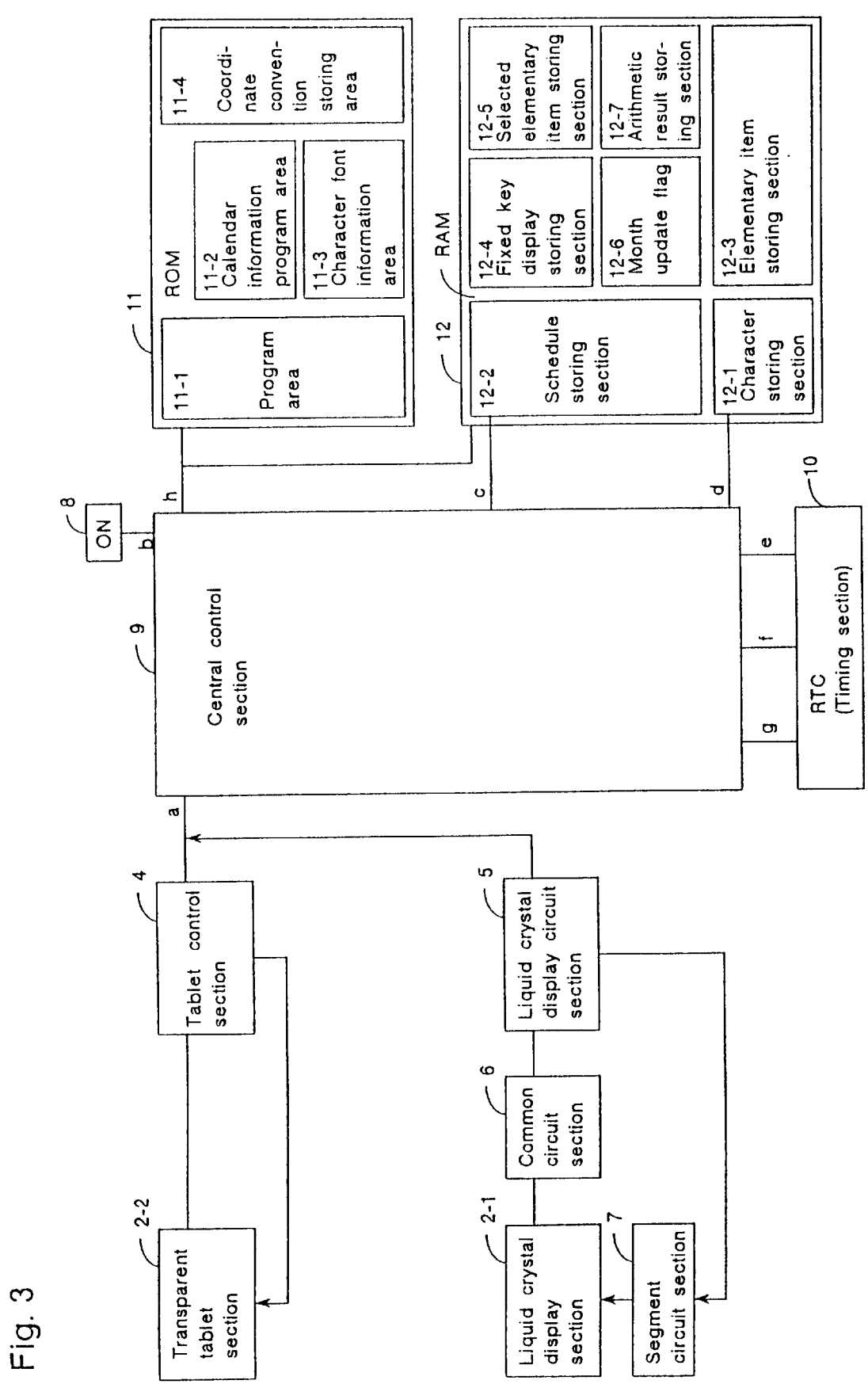
FIG. 3 is a block diagram showing a structure of the information processor according to the present invention.

FIG. 3 is a block diagram showing the information processor according to the present invention.

The information processor according to the present invention comprises a liquid crystal display section 2-1, a transparent tablet 2-2, a tablet control section 4, a liquid crystal display circuit section 5, a common circuit 6, a segment circuit 7, a body power switch 8, a central control section 9, a RTC (Realtime Clock) 10, a ROM 11 and a RAM 12.

The tablet control section 4 serves to fetch coordinate information from the transparent tablet 2-2, and is connected to the transparent electrodes provided on respective transparent sheets of the transparent tablet 2-2. By causing the transparent electrodes to come in contact with each other, the coordinates of a position indicated by a finger or a pen are detected.

The liquid crystal display circuit section 5 stores, as a bit map, a dot position in which a liquid crystal is lightened, and sends a signal to the common circuit 6 and the segment circuit 7 if necessary.

The central control section 9 serves to control input information or output information by various instructions, and has a control line a connected to the tablet control section 4, a control line b connected to the body power switch 8, a control line c connected to a schedule storing section 12-2 of the RAM 12, a control line d connected to a character storing section 12-1 of the RAM 12, control lines e, f and g connected to the RTC 10, and a control line h connected to the ROM 11.

The RTC 10 counts a time by a clock signal which is not shown, and outputs a current date and time.

The ROM 11 has a program area 11-1 for storing a program indicating operation of the central control section 9, a calendar information program area 11-2 for calculating a date, an information area 11-3 for storing character font to be displayed by the liquid crystal display section 2-1, and a coordinate conversion storing area 11-4 for storing conversion information for converting coordinates detected by the tablet control section 4 into coordinates corresponding to a display position.

The RAM 12 has a character storing section 12-1 for storing character information such as a text and the like inputted from the input-output section 2 by a user, a schedule storing section 12-2 for storing schedule data, an elementary item storing section 12-3 for storing elementary items of a schedule, a fixed key display storing section 12-4 for retaining display of a fixed key, a selected elementary item storing section 12-5 for retaining selected elementary items, a month update flag 12-6 for indicating that a month has been updated or a specific day registered by the user has come, and an arithmetic result storing section 12-7 for retaining a result obtained by calculating a day before the specific day registered by the user. Furthermore, end code is added to the tail of the elementary items of the elementary item storing section 12-3.

<First Embodiment>

Figure 6:
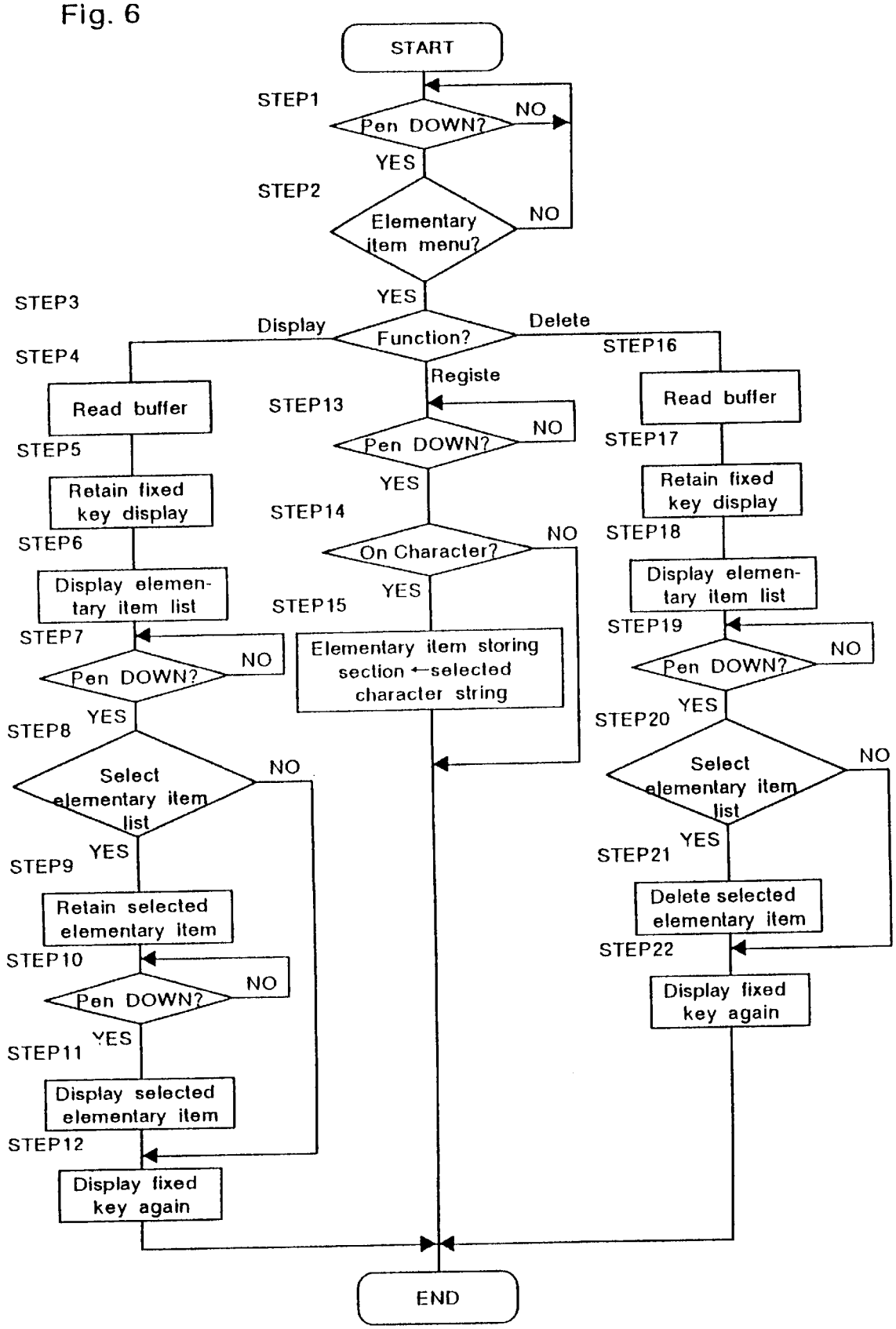
FIG. 6 is a flowchart showing procedure for displaying, registering and deleting elementary items of a schedule according to the present invention.
Figure 7:
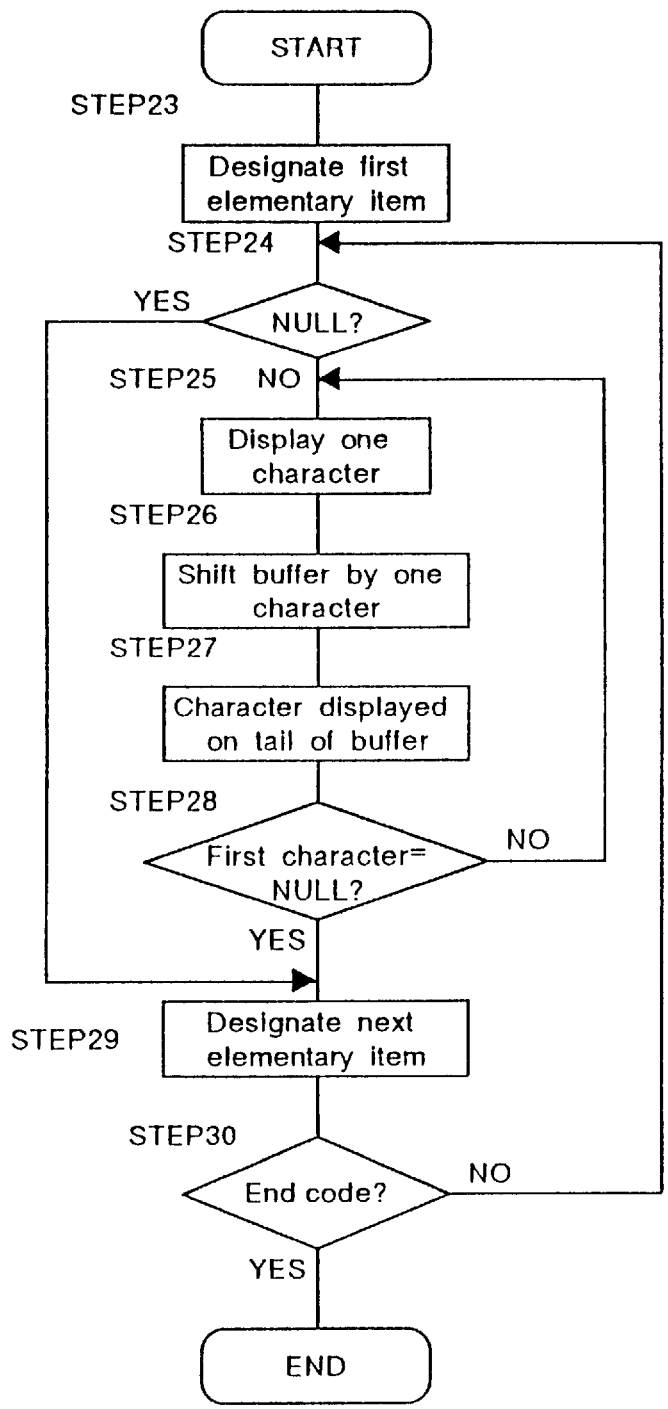
FIG. 7 is a flowchart showing procedure for displaying a list of the elementary items according to the present invention.

A processing of displaying, registering and deleting regular schedules for each month as elementary item schedules in order to prevent a trouble to input the same schedules every month will be described below with reference to examples of display screens in FIGS. 4 (a) and 4 (b) and FIGS. 5 (a) and 5 (b), and flowcharts in FIGS. 6 and 7.

First of all, a body power switch 8 is turned ON so that a power source is turned ON. When turning ON the power source, a mode which was used last time is set by a resume function. As shown in the example of the display screen in FIG. 4 (a), a fixed key 201 is operated so that a desired mode can be activated.

In the case where a schedule mode is not set when turning ON the power source, the schedule mode is set by touching a calendar/schedule of the fixed key 201 with a pen. Consequently, a calendar including a current date is displayed. When inputting a schedule, a schedule input mode for a desired date is set by touching the same date with the pen. Thus, a schedule for the same date is inputted. This is a general method for inputting a schedule.

A processing of displaying, registering and deleting elementary item schedules according to the present invention will be described below.

Figure 4:
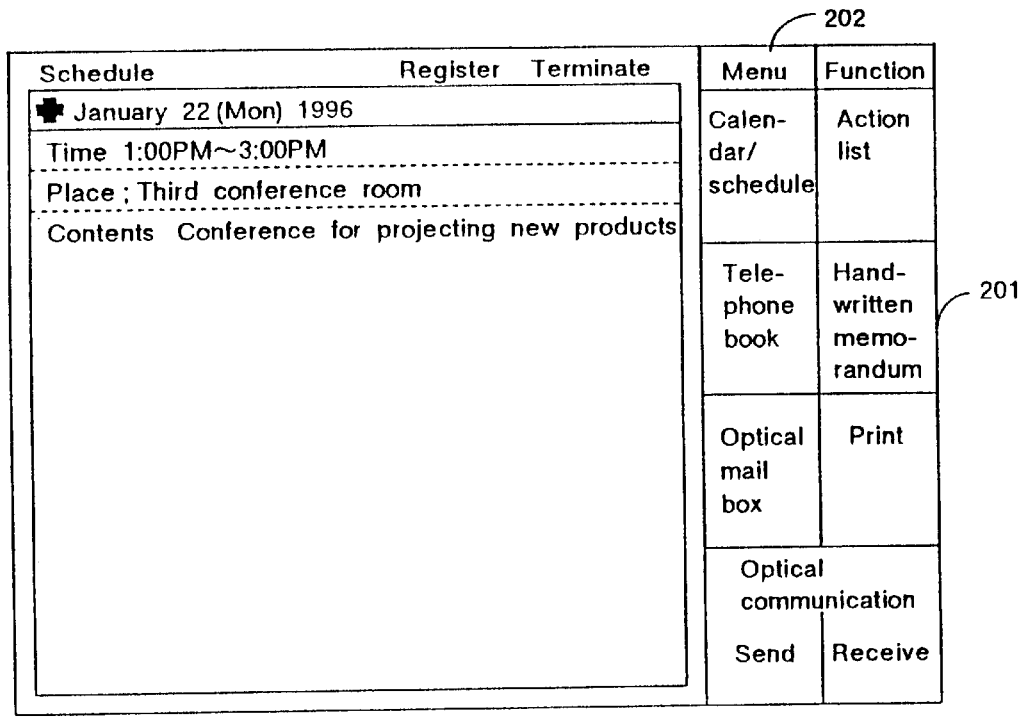
FIGS. 4 (*a*) and 4 (*b*) are diagrams showing examples of display screens according to the present invention.
Figure 4:
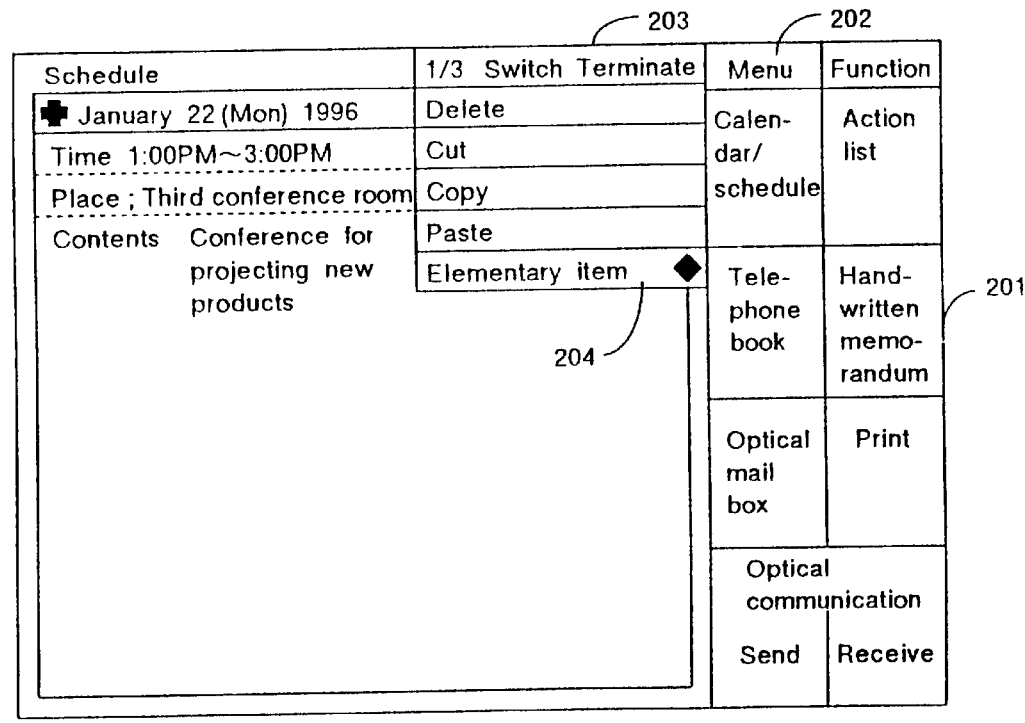

As shown in the example of the display screen in FIG. 4 (a), when a menu 202 of the fixed key 201 is touched with the pen, an edit menu 203 is displayed and an elementary item 204 is displayed on the lowest portion of the edit menu 203 (FIG. 4 (b)). Then, when the elementary item 204 is touched with the pen, an elementary item menu 205 is displayed as a submenu of the elementary item (FIG. 5 (a)). A desired function can be selected from the displayed elementary item menu 205.

The processing of displaying, registering and deleting elementary item schedules in which the elementary item menu 205 is displayed as shown in the example of the display screen in FIG. 5 (a) and the desired elementary item function is selected will be described below with reference to the flowchart in FIG. 6.

At STEP 1, pen touch on a display screen (an input-output section 2) is waited for in the state of display of the elementary item menu 205 as shown in FIG. 5 (a). At STEP 2, it is detected that the elementary item menu 205 is touched or not. If a portion other than the display screen of the elementary item menu 205 is touched with the pen, the routine returns to STEP 1 and pen touch is waited for. If the display screen of the elementary item menu 205 is touched with the pen, the routine proceeds to STEP 3.

At STEP 3, it is decided which function is selected. If a display function is selected, processings of STEP 4 to STEP 12 are executed. If a registration function is selected, processings of STEP 13 to STEP 15 are executed. If a delete function is selected, processings of STEP 16 to STEP 22 are executed.

First of all, the case where the display function is selected will be described below.

At STEP 4, elementary item schedules are read out of an elementary item storing section 12-3 of a RAM 12 to a buffer of a central control section 9. At STEP 5, the contents of display corresponding to the fixed key 201 are retained in a fixed key display storing section 12-4 of the RAM 12. At STEP 6, an elementary item list 206 is displayed on the fixed key 201 as shown in the example of the display screen in FIG. 5 (b). A processing of displaying the elementary item list will be described below in detail with reference to the flowchart in FIG. 7.

At STEP 7, it is decided whether or not the display screen (input-output section 2) is touched with the pen. If the display screen is touched with the pen, it is decided whether or not a position of pen touch is on the elementary item list 206 at STEP 8. If the elementary item list 206 is not touched with the pen, the routine proceeds to STEP 12. If the elementary item list 206 is touched with the pen, the selected elementary item schedule is retained in a selected elementary item storing section 12-5 of the RAM 12 at STEP 9. At STEP 10, a user is waited for to specify a position where the elementary item schedule is to be displayed. At STEP 11, the elementary item schedule retained at STEP 9 is displayed in the specified position. At STEP 12, the fixed key 201 is displayed again.

While the user specifies the display position after selecting the desired elementary item schedule from the elementary item list, the user may select the desired elementary item schedule from the elementary item list after specifying the display position.

The case where the registration function is selected will be described below.

At STEP 13, pen touch on the display screen (input-output section 2) is waited for. When the display screen is touched with the pen, it is decided whether or not a character string to be registered is selected at STEP 14. If the character string is not selected, nothing is performed. For example, if a character string of "Conference for projecting new products" of the contents of the schedule shown in FIG. 5 (a) is to be registered as an elementary item schedule, registration of the elementary item menu 205 is specified and the "Conference for projecting new products" is selected with the pen. In this case, the selected character string of "Conference for projecting new products" is additionally registered in the elementary item storing section 12-3 of the RAM 12 at STEP 15.

While the user specifies the schedule to be registered after selecting the registration of the elementary item menu, the user may select the registration of the elementary item menu after specifying the schedule to be registered.

The case where the delete function is selected will be described below.

At STEP 16, an elementary item schedule is read out of the RAM 12 to the buffer of the central control section 9. At STEP 17, the display of the fixed key 201 in FIG. 5 (a) is retained in the fixed key display storing section 12-4 of the RAM 12. At STEP 18, the elementary item list 206 is displayed on the fixed key 201 as shown in FIG. 5 (b). A processing of displaying the elementary item list will be described below in detail with reference to the flowchart in FIG. 7. At STEP 19, it is decided whether or not the input-output section 2 is touched with the pen. If the input-output section 2 is touched with the pen, it is decided whether or not a position of pen touch is on the elementary item list 206 at STEP 20. If the elementary item list 206 is not touched with the pen, the routine proceeds to STEP 22. If the elementary item list 206 is touched with the pen, the routine proceeds to STEP 21 where the selected elementary item schedule is deleted from the elementary item storing section 12-3 of the RAM 12. At STEP 22, the fixed key 201 is displayed again.

The processing of displaying the elementary item list will be described below with reference to the flowchart in FIG. 7.

First of all, an initial region of the buffer of the central control section 9 for storing the elementary item schedule read out of the elementary item storing section 12-3 is designated at STEP 23. At STEP 24, it is decided whether or not the stored contents are NULL. If the stored contents are NULL, the routine proceeds to STEP 29. If the stored contents are not NULL, a first character of the contents of the buffer which are being designated is displayed at STEP 25. At STEP 26, the contents of the buffer are shifted by one character. At STEP 27, one character displayed on the tail of the buffer is set. At STEP 28, it is decided whether or not the first character of the buffer is NULL. If the first character of the buffer is not NULL, the routine returns to STEP 25. If the first character of the buffer is NULL, the routine proceeds to STEP 29 where a next elementary item schedule is designated. At STEP 30, it is decided whether or not the contents of the buffer are end code. If the contents of the buffer are not the end code, the routine returns to STEP 24. If the contents of the buffer are the end code, the display processing is ended. The end code designates an end of data of the elementary item storing section 12-3 of the RAM 12. For example, a special mark such as "¥" is set to the end code.

As described above, a series of processings related to the display, registration and delete of the elementary item schedules can be performed.

<Second Embodiment>

Referring to scheduling, for example, "Conference for projecting new products", "Regular arrangement", "Data update", "Payment of rent" and "Meeting for exchanging information" are registered as five elementary item schedules in January, respectively. When January ends and February comes, that is, a first day comes, a list of the five elementary item schedules registered last month is selectively displayed. This processing will be described below in detail with reference to FIGS. 8 to 10.

Figure 8:
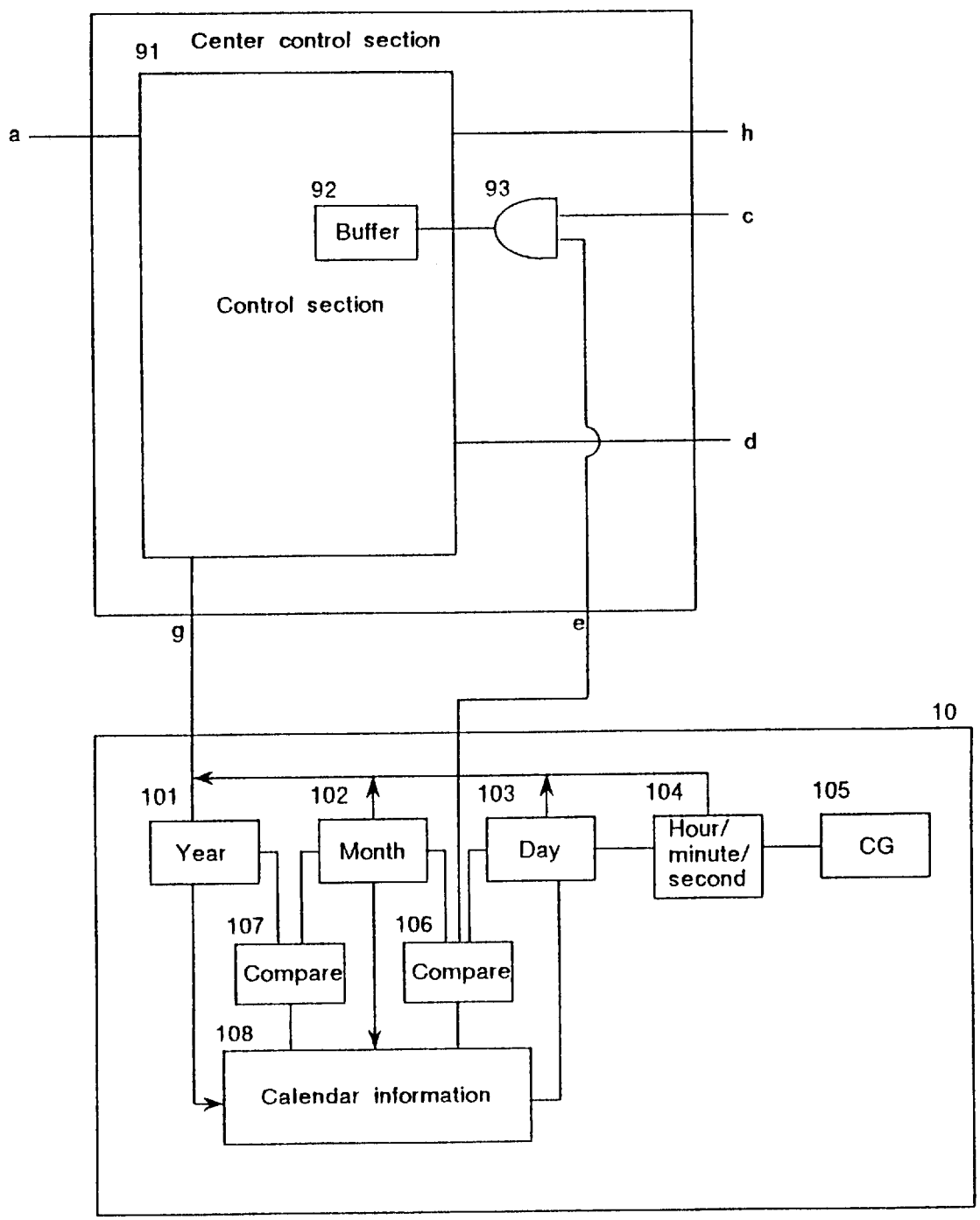
FIG. 8 is a detailed block diagram showing structures of a central control section and a RTC according to the present invention.

As shown in FIG. 8, a RTC 10 which acts as time counting means includes a year counter 101 for counting a year, a month counter 102 for counting a month, a day counter 103 for counting a day, an hour/minute/second counter 104 having an hour counter, a minute counter and a second counter, a clock generator for counting a time (hereinafter referred to as a CG) 105, comparing circuits 106 and 107 for comparing the contents of the above-mentioned counters with calendar information 108, and the calendar information 108.

The CG 105 for counting a time sends a signal having one pulse per second to the hour/minute/second counter 104. When this signal is received, the contents of the second counter of the hour/minute/second counter 104 are increased by 1. When the second counter reaches "60", the contents of the minute counter are increased by 1. Similarly, when the minute counter reaches "60", the contents of the hour counter are increased by 1. When 24 hours pass in the hour/minute/second counter 104, a signal is sent to the day counter 103 so that the contents of the day counter 103 are increased by 1. Every time the contents of the day counter 103 are increased, the comparing circuit 106 compares the contents of the day counter 103 with those of the calendar information 108 to decide whether or not a current value is the end of a month. When the end of the month passes, the comparing circuit 106 sends a signal to the month counter 102 so that the contents of the month counter 102 are increased by 1. Every time the contents of the month counter 102 are increased, the comparing circuit 107 compares the contents of the month counter 102 with those of the calendar information 108 to decide whether or not a current value exceeds "12". When the current value exceeds "12", a signal is sent from the comparing circuit 107 to the year counter 101 so that the contents of the year counter 101 are increased by 1. At the same time that the year, month and day are changed, this change is also stored in the calendar information 108. The contents of the year counter 101, the month counter 102, the day counter 103, and the hour/minute/second counter 104 are sent to a central control section 9 through a control line g. This is a general processing of counting a time.

Figure 9:
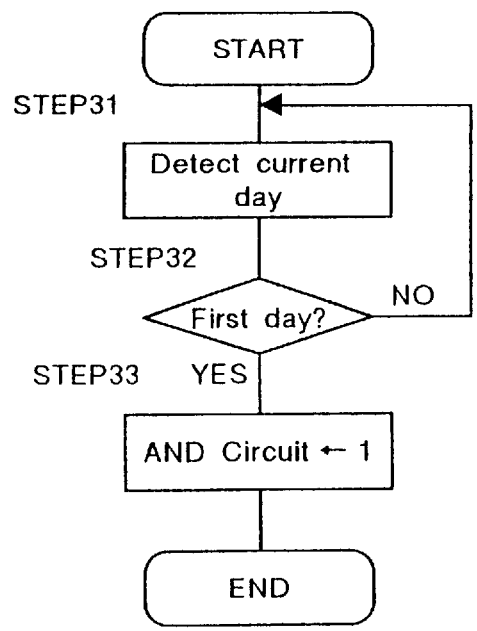
FIG. 9 is a flowchart showing procedure for a month update and detection processing according to the present invention.

A month update and detection processing will be described below with reference to a block diagram of FIG. 8 and a flowchart of FIG. 9.

At STEP 31, a current day is first detected. At STEP 32, it is decided whether or not the current day is a "first day". An AND circuit 93 of the central control section 9 makes AND of a signal received from a control line c connected to the elementary item storing section 12-3 of the RAM 12 and a signal received from a control line e, and always sends the contents of the elementary item storing section 12-3 of the RAM 12 from the control line c. If the current day is the "first day", the contents of a buffer 92 of a control section 91 are cleared. At STEP 33, a signal "1" is sent from the comparing circuit 106 to the AND circuit 93. Then, the contents of the elementary item storing section 12-3 are sent to the buffer 92 of the control section 91 through the AND circuit 93.

Figure 10:
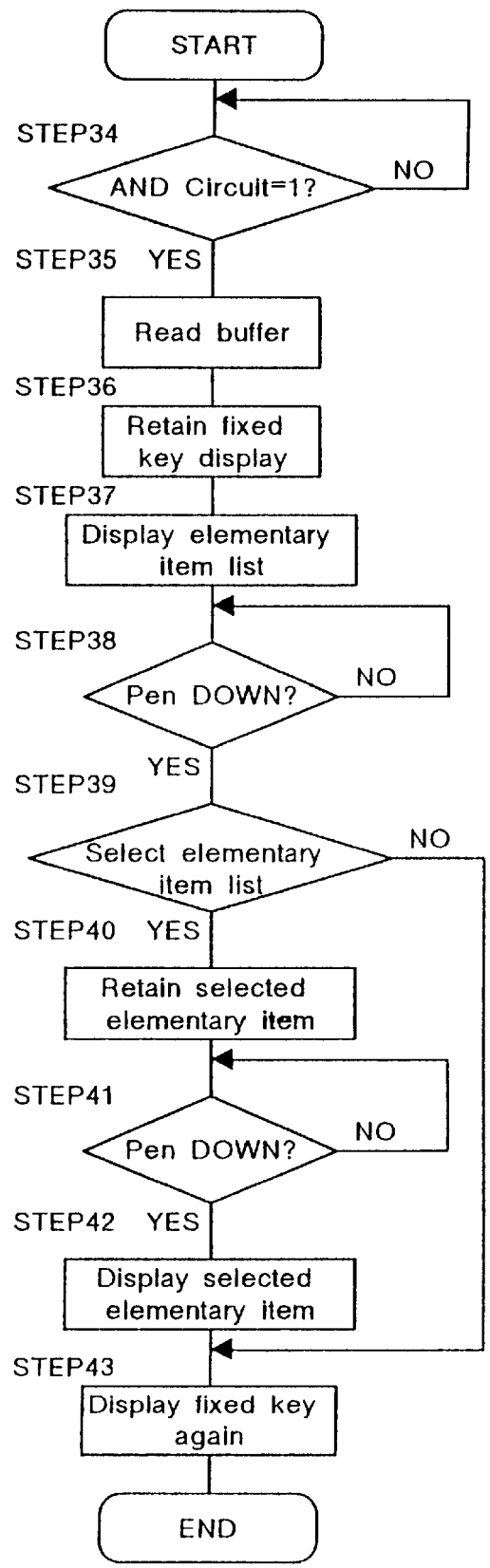
FIG. 10 is a flowchart showing procedure for displaying and selecting the elementary items of the schedule according to the present invention.

Procedure for displaying the elementary item schedule will be described below with reference to a flowchart of FIG. 10.

At STEP 34, it is first decided whether or not an output of the AND circuit is "1". If the output of the AND circuit is "1", processings of STEP 35 to STEP 43 are executed. If the output of the AND circuit is "0", nothing is performed. Since the processings of STEP 35 to STEP 43 are the same as those of STEP 4 to STEP 12 shown in FIG. 6, their description will be omitted.

By the above-mentioned processings, the list of the elementary items can be displayed in response to update of a month.

<Third Embodiment>

Referring to scheduling, for example, "Conference for projecting new products", "Regular arrangement", "Data update", "Payment of rent" and "Meeting for exchanging information" are registered as five elementary item schedules in January, respectively. Furthermore, when creating a schedule for a next month five days before beginning of a month, a user sets "5 days" as specific days. When January 26 comes, a list of the five elementary item schedules registered last month is selectively displayed. This processing will be described below in detail with reference to FIGS. 11 and 12.

Figure 11:
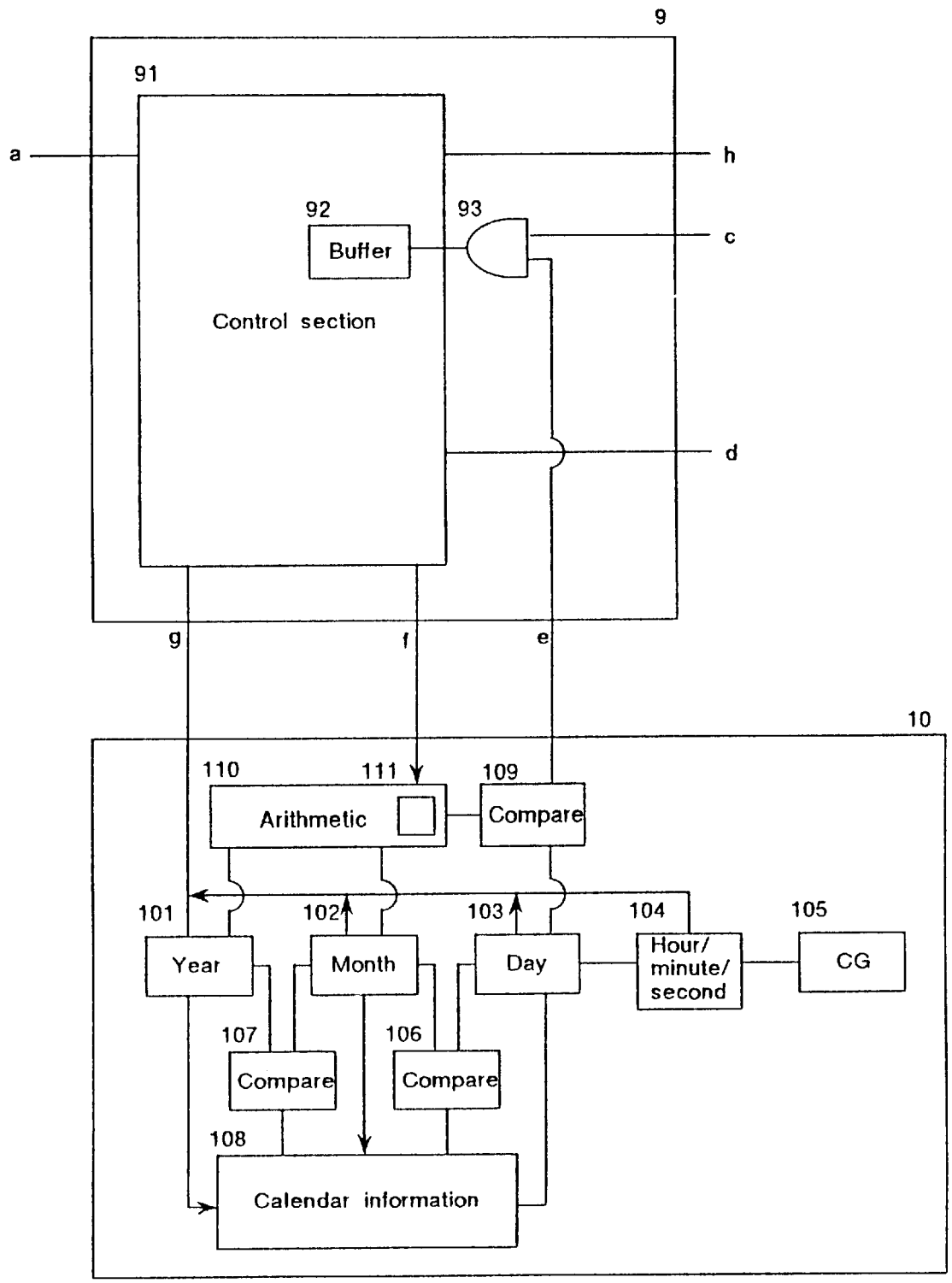
FIG. 11 is a detailed block diagram showing the structures of the central control section and the RTC according to the present invention.

FIG. 11 is a block diagram showing a central control section 9 and a RTC 10 according to the present embodiment, in which a comparing circuit 109 and an arithmetic circuit 110 are added to the time counting means of the RTC 10 shown in FIG. 8.

Figure 12:
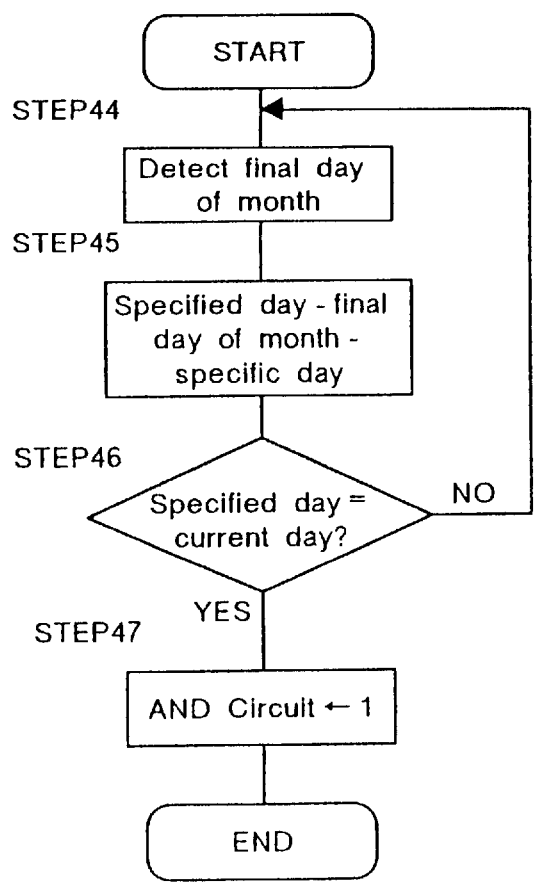
FIG. 12 is a flowchart showing the procedure for the month update and detection processing according to the present invention.

A month update and detection processing according to the present embodiment will be described below with reference to FIGS. 11 and 12.

The user registers, in advance, the number of days before a month update day that the list of the elementary items should be displayed. The number of days is set as a constant 111 to the arithmetic circuit 110 of the RTC 10. According to the present embodiment, "5 days" are set as the constant 111.

At STEP 44, a final day of a month is first calculated from a year counter 101 and a month counter 102 by the arithmetic circuit 110. At STEP 45, the number of days stored as the constant 111 is subtracted from the date. In January, "5 days" are subtracted from "31 days". Consequently, "26" is sent as a specified day to the comparing circuit 109. At STEP 46, the specified day is compared with a value of a day counter 103 by the comparing circuit 109 to decide whether or not they are identical to each other. If they are identical to each other, the contents of a buffer 92 of a control section 91 are cleared and a signal "1" is sent from the comparing circuit 109 to an AND circuit 93.

The contents of an elementary item storing section 12-3 are sent to the buffer 92 of the control section 91 by the AND circuit 93 so that the list of the elementary items is displayed. Since this processing is the same as the processing described with reference to the flowchart of FIG. 10 according to the second embodiment, its description will be omitted.

According to the above-mentioned processings, the list of the elementary items can be displayed in response to detection of the day set before the month update date by the specific number of days.

<Fourth Embodiment>

Referring to scheduling, for example, "Conference for projecting new products", "Regular arrangement", "Data up-date", "Payment of rent" and "Meeting for exchanging information" are registered as five elementary item schedules in January, respectively. Furthermore, when creating a schedule for a next month on 20th of that month, a user sets "20" as a specific day. When January 20 comes, a list of the five elementary item schedules registered last month is selectively displayed. This processing will be described below in detail with reference to FIGS. 13 and 14.

Figure 13:
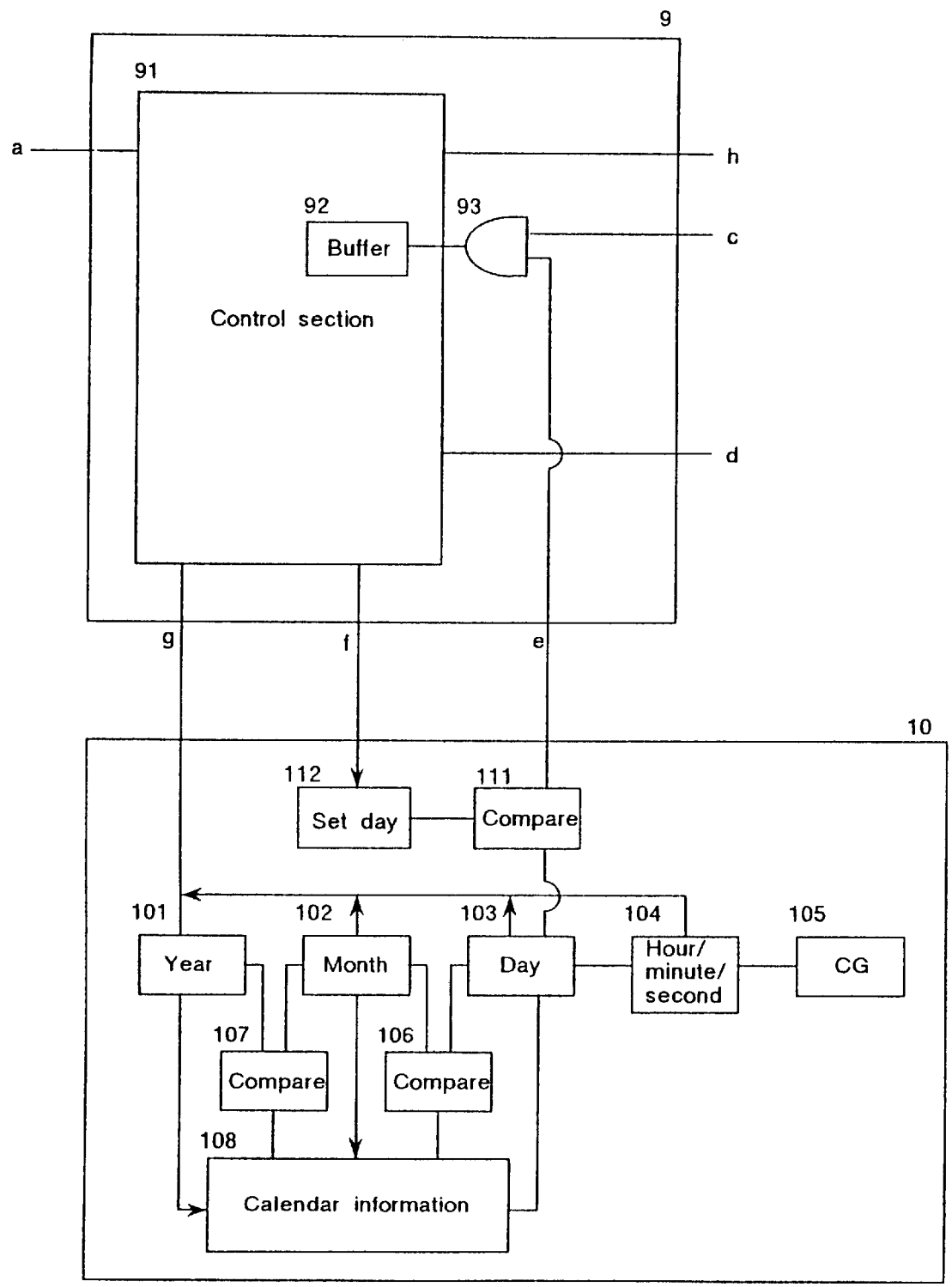
FIG. 13 is a detailed block diagram showing the structures of the central control section and the RTC according to the present invention.

FIG. 13 is a block diagram showing a central control section 9 and a RTC 10 according to the present embodiment, in which a comparing circuit 111 and a set day storing section 112 are added to the time counting means of the RTC 10 shown in FIG. 8.

Figure 14:
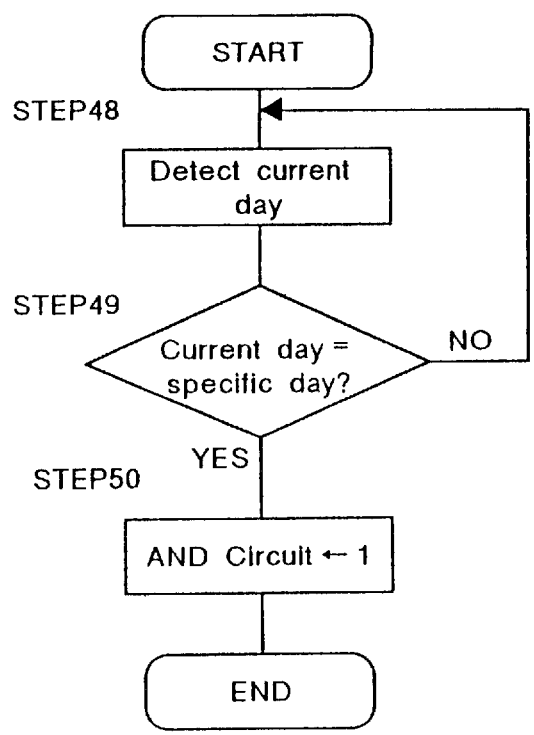
FIG. 14 is a flowchart showing the procedure for the month update and detection processing according to the present invention.

A month update and detection processing according to the present embodiment will be described below with reference to FIGS. 13 and 14.

The user preliminarily registers, by key input, a date that the list of the elementary items should be displayed. The date is set to the set day storing section 112 of the RTC 10.

At STEP 48, a current day is first detected from a day counter 103. At STEP 49, it is decided, by the comparing circuit 111, whether or not the day set to the set day storing section 112 is identical to the current day. If the set day is identical to the current day, the contents of a buffer 92 of a control section 91 are cleared and a signal "1" is sent to an AND circuit 93 of the central control section 9 through a control line e at STEP 50. If the set day is not identical to the current day, nothing is performed. The AND circuit 93 of the central control section 9 makes AND of a signal received from a control line c connected to an elementary item storing section 12-3 of a RAM 12 and a signal received from the control line e, and always sends the contents of the elementary item storing section 12-3 of the RAM 12 through the control line c.

When the signal "1" is sent from a comparing circuit 106 to the AND circuit 93, the contents of the elementary item storing section 12-3 are sent to the buffer 92 of the control section 91 by the AND circuit 93 so that the list of the elementary items is displayed. Since this processing is the same as the processing described with reference to the flowchart of FIG. 10 according to the second embodiment, its description will be omitted.

By the above-mentioned processings, the list of the elementary items can be displayed in response to detection of an optional day registered by the user.

<Fifth Embodiment>

Referring to scheduling, for example, "Conference for projecting new products", "Regular arrangement", "Data update", "Payment of rent" and "Meeting for exchanging information" are registered as five elementary item schedules in January, respectively. When January passes and February 1 comes, the contents of a buffer 92 of a control section 91 are first cleared and a group of elementary item schedules is sent from an elementary item storing section 12-3 of a RAM 12 to the buffer 92 of the control section 91. When a power source is first turned ON on February 1, a list of the five elementary item schedules registered last month is selectively displayed.

While the second embodiment has been employed for a month update and detection processing, the third or fourth embodiment may be employed. According to the present embodiment, particularly, the list of the elementary items of the schedules is selectively displayed when the power source is turned ON on the month update day as described in the second to fourth embodiments.

Figure 15:
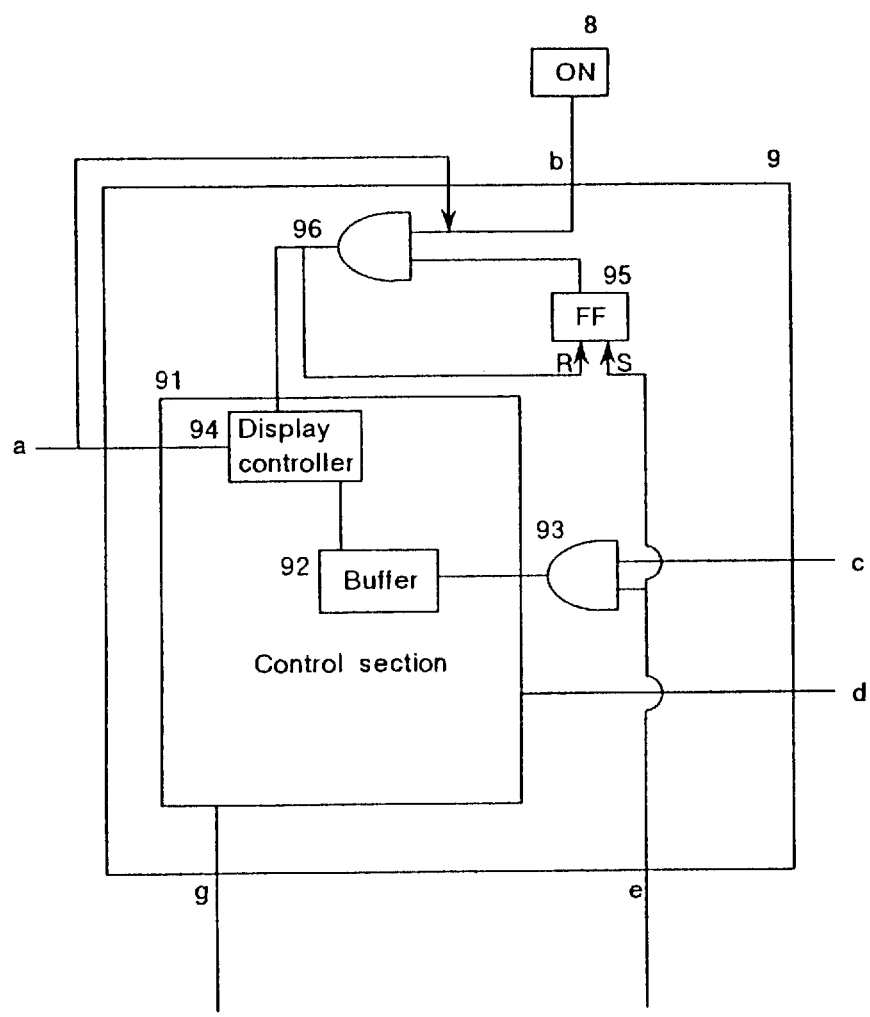
FIG. 15 is a detailed block diagram showing the structure of the central control section according to the present invention.
Figure 16:
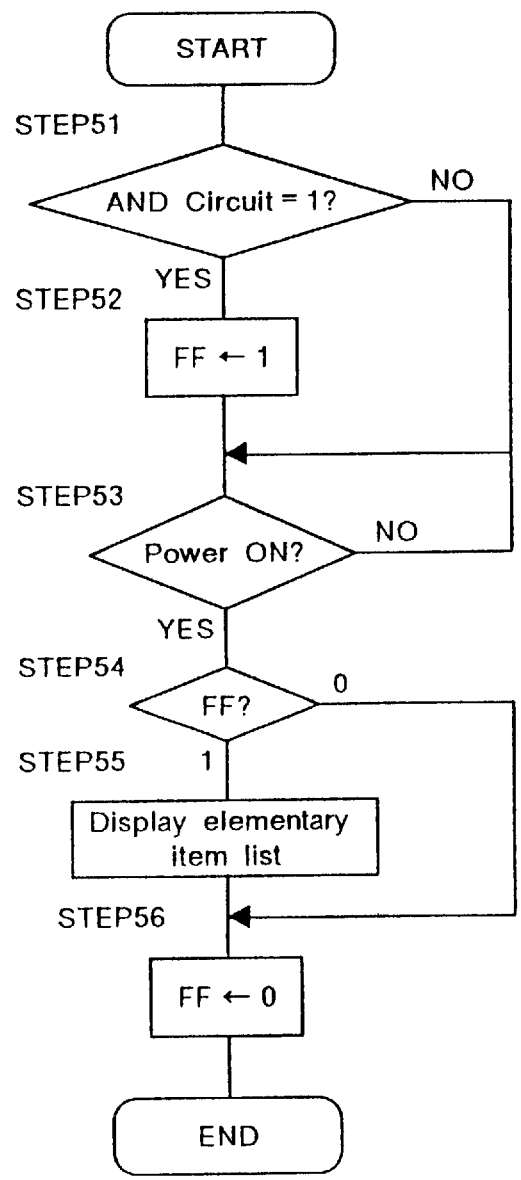
FIG. 16 is a flowchart showing procedure for activating to display a list of the elementary items of the schedule according to the present invention.

The above-mentioned processings will be described below with reference to FIGS. 15 and 16.

First of all, a signal "1" is sent from a control line e to an AND circuit 93 by any of the month update and detection processings according to the second to fourth embodiments, and the contents of the elementary item storing section 12-3 are sent to the buffer 92 of the control section 91. At the same time, the signal "1" sent from the control line e is also sent to an input terminal S of a flip-flop (hereinafter referred to as a FF) 95 so that "1" is sent from an output terminal to an AND circuit 96.

At STEP 51, it is decided whether or not the AND circuit 93 is "1", that is, the signal "1" is sent from a day counter 103. If the AND circuit 93 is "1", "1" is set to the FF 95 at STEP 52. At this time, an output "1" of the FF 95 is sent to the AND circuit 96. If the AND circuit 93 is not "1", nothing is performed. At STEP 53, it is decided whether or not a body power switch 8 is turned ON. When the power source is turned ON, the signal "1" is sent from the body power switch 8 to the AND circuit 96. If the power source is ON, the routine proceeds to STEP 54. If the power source is not ON, nothing is performed.

At STEP 54, it is decided whether the output of the FF 95 is "1" or "0". If the output of the FF 95 is "1", the AND circuit 96 makes AND of the signal "1" sent from the body power switch 8 and the signal "1" of the FF 95, and sends a signal "1" to a display controller 94 and an input terminal R of the FF 95. At STEP 55, the display controller 94 receives the signal "1" and gives an instruction to display the contents of the buffer 92. At STEP 56, the FF 95 is reset by receiving "1" from the input terminal R, and sends a signal "0" to the AND circuit 96.

By these processings, the list of the elementary items can be displayed when turning ON the power source after performing any of the month update and detection processings according to the second to fourth embodiments.

<Sixth Embodiment>

Referring to scheduling, for example, "Conference for projecting new products", "Regular arrangement", "Data update", "Payment of rent" and "Meeting for exchanging information" are registered as five elementary item schedules in January, respectively. When January passes and February 1 comes, a group of elementary item schedules is sent from an elementary item storing section 12-3 of a RAM 12 to a buffer 92 of a central control section 9. When a schedule mode is first selected on February 1, a list of the five elementary item schedules registered last month is selectively displayed.

While the second embodiment has been employed for a month update and detection processing, the third or fourth embodiment may be employed. According to the present embodiment, particularly, the list of the elementary items of schedules is selectively displayed in response to schedule mode selection on the month update day described in the second to fourth embodiments.

Figure 17:
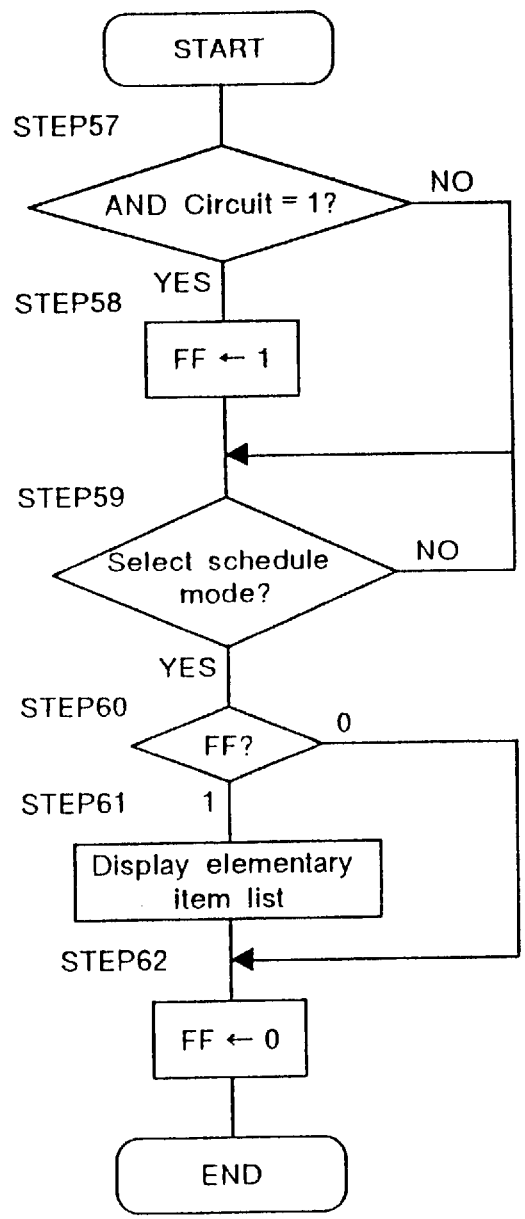
FIG. 17 is a flowchart showing the procedure for activating to display the list of the elementary items of the schedule according to the present invention.

The above-mentioned processings will be described below with reference to FIGS. 15 and 17.

First of all, a signal "1" is sent from a control line e to an AND circuit 93 by any of the month update and detection processings according to the second to fourth embodiments, and the contents of the elementary item storing section 12-3 are sent to the buffer 92 of a control section 91. At the same time, the signal "1" sent from the control line e is also sent to an input terminal S of a FF 95 so that "1" is sent from an output terminal to an AND circuit 96.

At STEP 57, it is decided whether or not the AND circuit 93 is "1", that is, the signal "1" is sent from a day counter 103. When the AND circuit 93 is "1", "1" is set to the FF 95 at STEP 58. At this time, an output "1" of the FF 95 is sent to the AND circuit 96. If the AND circuit 93 is not "1", nothing is performed. At STEP 59, it is decided whether or not the schedule mode is selected. If the schedule mode is selected, a signal "1" is sent from a tablet control section 4 to the AND circuit 96 and the routine proceeds to STEP 60. If the schedule mode is not selected, nothing is performed.

At STEP 60, it is decided whether the output of the FF 95 is "1" or "0". If the output of the FF 95 is "1", the AND circuit 96 makes AND of the signal "1" sent from the tablet control section 4 and the signal "1" of the FF 95, and sends a signal "1" to a display controller 94 and an input terminal R of the FF 95. At STEP 61, the display controller 94 receives the signal "1" and gives an instruction to display the contents of the buffer 92. At STEP 62, the FF 95 is reset by receiving "1" from the input terminal R, and sends a signal "0" to the AND circuit 96.

By these processings, the list of the elementary items can be displayed when selecting the schedule mode after performing any of the month update and detection processings according to the second to fourth embodiments.

<Seventh Embodiment>

Referring to scheduling, for example, "Conference for projecting new products", "Regular arrangement", "Data update", "Payment of rent" and "Meeting for exchanging information" are registered as five elementary item schedules in January, respectively. When January passes and February 1 comes, the contents of a buffer 98 of a central control section 9 are cleared and a group of elementary item schedules is sent from an elementary item storing section 12-3 of a RAM 12 to the buffer 98 of the central control section 9. At this time, a list of the five elementary item schedules registered last month is selectively displayed.

If the "Data update" is selected, a region of the "Data update" of the contents of the buffer 98 is displayed and cleared. When the list of the elementary items is displayed next time, the region of the "Data update" becomes blank.

Similarly, when the "Payment of rent" is selected from the list of the elementary items, an elementary item list 207 is selectively displayed next time as shown in FIG. 18. A user can select only unselected elementary item schedules.

While the second embodiment has been employed for the month update and detection processing, the third or fourth embodiment may be employed.

The above-mentioned processings will be described below with reference to FIGS. 18 to 21.

Figure 19:
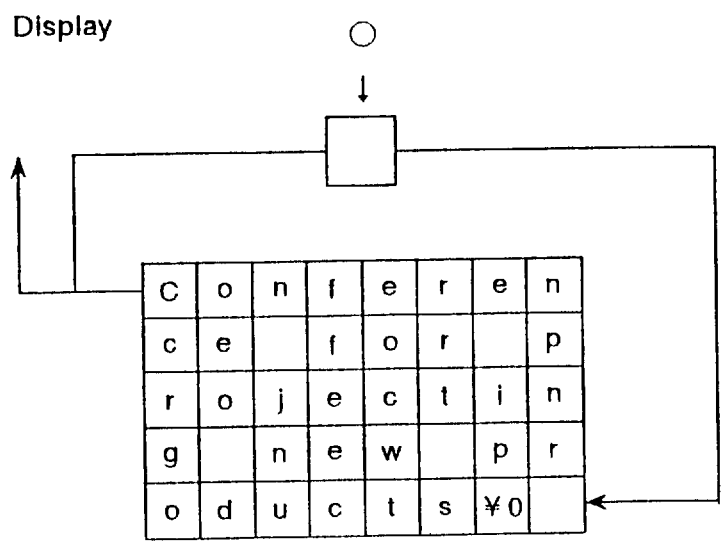
FIGS. 19 (*a*) and 19 (*b*) are diagrams showing a structure of a buffer in the central control section, respectively.
Figure 19:
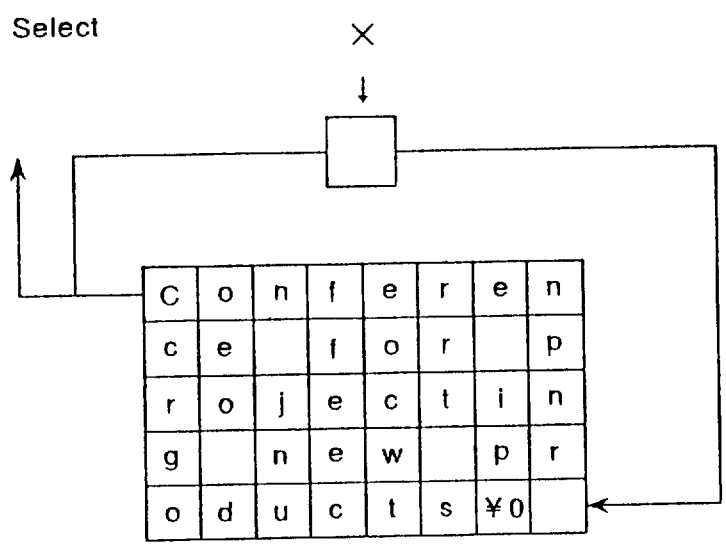

FIGS. 19 (a) and 19 (b) are diagrams showing the contents of the buffer for displaying the elementary item schedules. NULL indicative of an end is set to the tail of the elementary item schedules.

FIG. 19 (a) shows the contents of the buffer for displaying the elementary item list in the central control section 9 described in the first embodiment. Every time one character is displayed, the contents of the buffer are shifted. The displayed character is set to the tail which becomes blank by shift. This is circular shift.

FIG. 19 (b) shows the contents of the buffer in the display of the elementary items when performing selection according to the present embodiment, which will be described below in detail. Every time one character is displayed, the contents of the buffer are shifted. NULL is set to the tail which becomes blank by shift. This is logical shift. These processings are controlled by the central control section 9.

Figure 20:
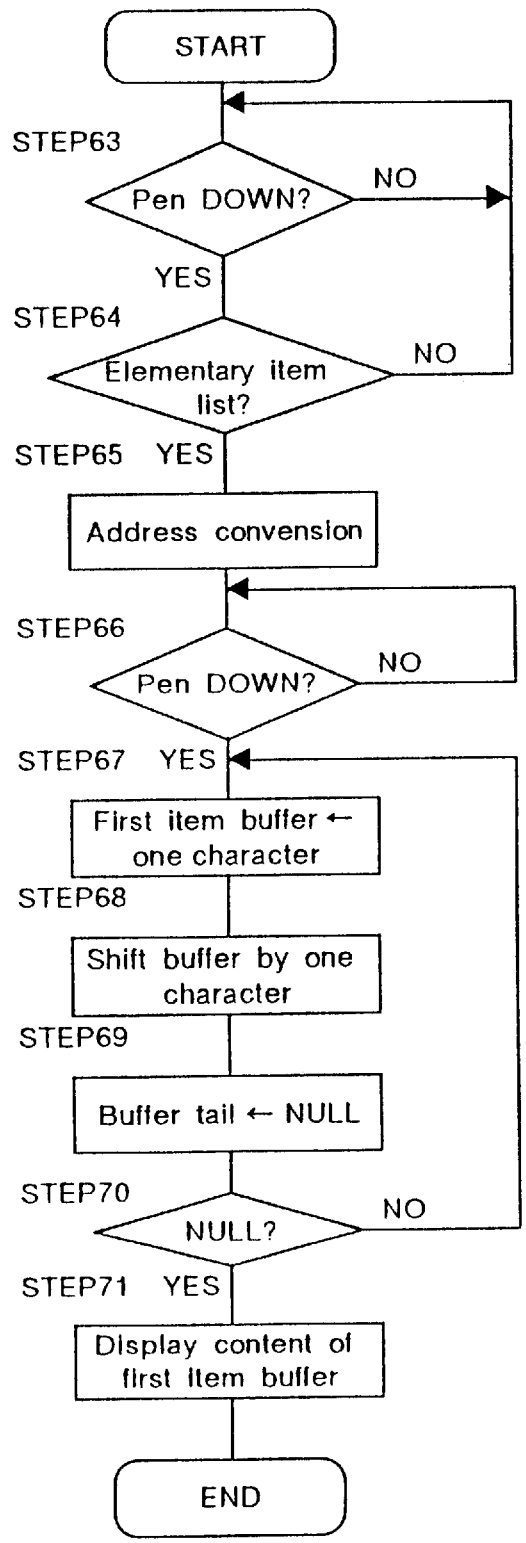
FIG. 20 is a flowchart showing procedure for selecting the elementary items of the schedule.
Figure 21:
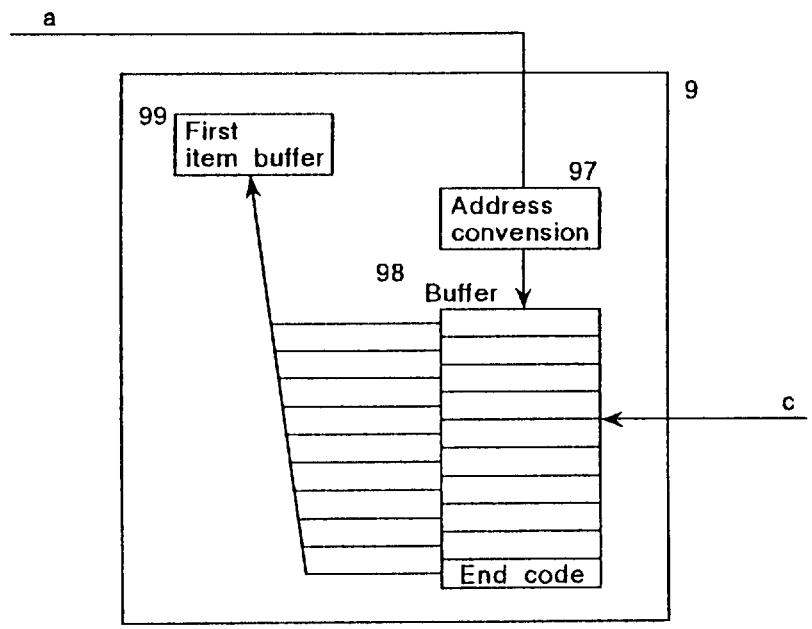
FIG. 21 is a detailed block diagram showing a structure of the central control section according to the present invention.

A processing of selecting one of the elementary item schedules from the displayed elementary item list by any of the month update and detection processings according to the second to fourth embodiments will be described below with reference to FIGS. 20 and 21.

At STEP 63, pen touch on an input-output section 2 is waited for. When the input-output section 2 is touched with the pen, it is decided whether or not the elementary item list is touched with the pen at STEP 64. If a portion other than the elementary item list is touched with the pen, the routine returns to STEP 63. If the elementary item list is touched with the pen, address conversion is performed in order to obtain an elementary item schedule corresponding to the touched portion at STEP 65.

At STEP 66, a user is waited for to touch, with the pen, a portion on a display screen (the input-output section 2) where the elementary item schedules are to be displayed. If the portion where the elementary item schedules are to be displayed is specified, a first character of the selected elementary item is set to a first item buffer 99 at STEP 67. At STEP 68, the contents of the buffer 98 are shifted by one character by the central control section 9. At STEP 69, NULL is set to the tail of the buffer 98. At STEP 70, the contents of the shifted buffer 98 are decided. If the contents of the shifted buffer 98 are NULL, one elementary item has been completely set to the first item buffer 99 and the routine proceeds to STEP 71. If the contents of the shifted buffer 98 are not NULL, processings of STEP 67 to STEP 70 are repeated. At STEP 71, the contents of the first item buffer 99 are displayed on the portion specified by the user at STEP 66.

While the user specifies a display position after selecting the displayed elementary items, the display position may be specified when the elementary item list is displayed.

According to the above-mentioned processings, the selected elementary item is NULL data in the buffer 98 provided in the central control section 9. When the elementary item list is displayed next time, it is displayed with the number of the elementary item schedules decreased as shown by 207 in FIG. 18. Consequently, since the elementary item schedules which have been inputted are not displayed, the user can easily input the elementary item schedules.

However, this state is temporary. Even if the elementary item schedule is the NULL data in the central control section 9, the contents of the elementary item storing section 12-3 of the RAM 12 are not changed. When inputting the schedules next month, all the registered elementary item schedules are displayed in the same manner as the elementary item list 206 shown in FIG. 5 (*b*).

<Eighth Embodiment>

Figure 22:
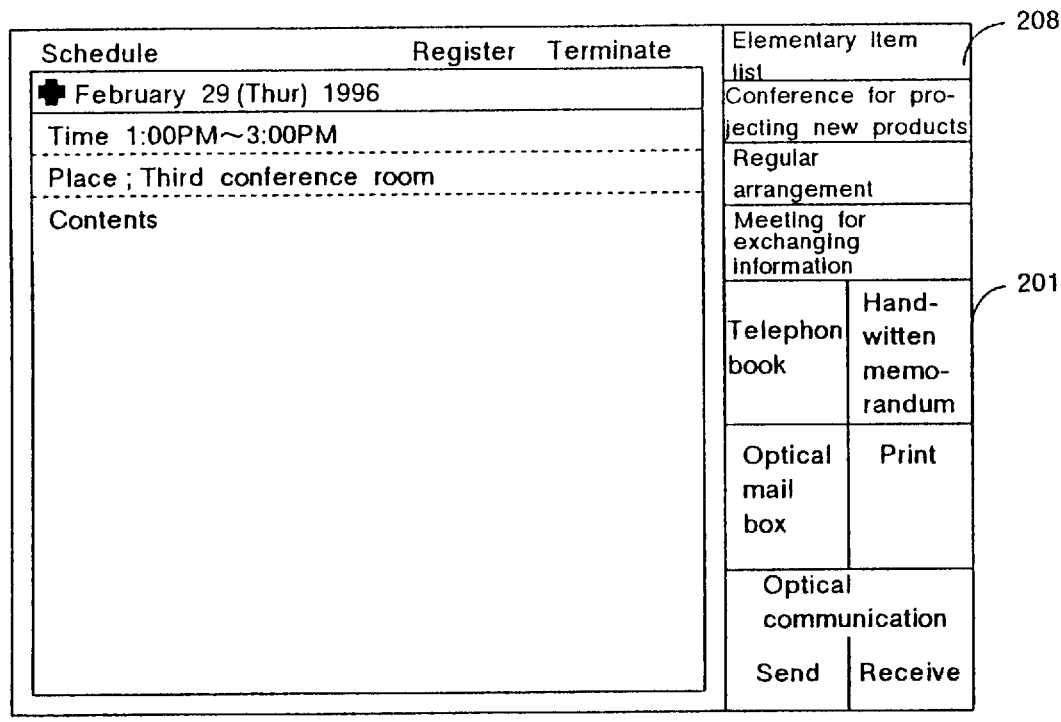
FIG. 22 is a diagram showing an example of the display screen according to the present invention.

Referring to scheduling, for example, "Conference for projecting new products", "Regular arrangement", "Data update", "Payment of rent" and "meeting for exchanging information" are registered as five elementary item schedules in January, respectively. When January passes and February 1 comes, the contents of a buffer 98 of a central control section 9 are cleared and a group of elementary items is sent from an elementary item storing section 12-3 of a RAM 12 to the buffer 98 of the central control section 9. At this time, a list of the five elementary item schedules registered last month is selectively displayed. If the "Conference for projecting new products" is selected, the contents of the elementary item storing section 12-3 are sent to the buffer 98 and all the contents of a flag section of the elementary item storing section 12-3 are then cleared. Thereafter, "1" is set to the flag of the elementary item storing section 12-3 corresponding to the selected "Conference for projecting new products". Similarly, if the "Regular arrangement" and the "Meeting for exchanging information" are selected from the list of the elementary items, "1" is set to only flags of the three selected elementary items in the elementary item storing section 12-3. By these processings, an elementary item list for a next month is displayed such that an elementary item list 208 can be selected as shown in FIG. 22. A user can input only the regular schedules inputted last month.

Any of the month update and detection processings according to the second to fourth embodiments may be employed.

Figure 23:
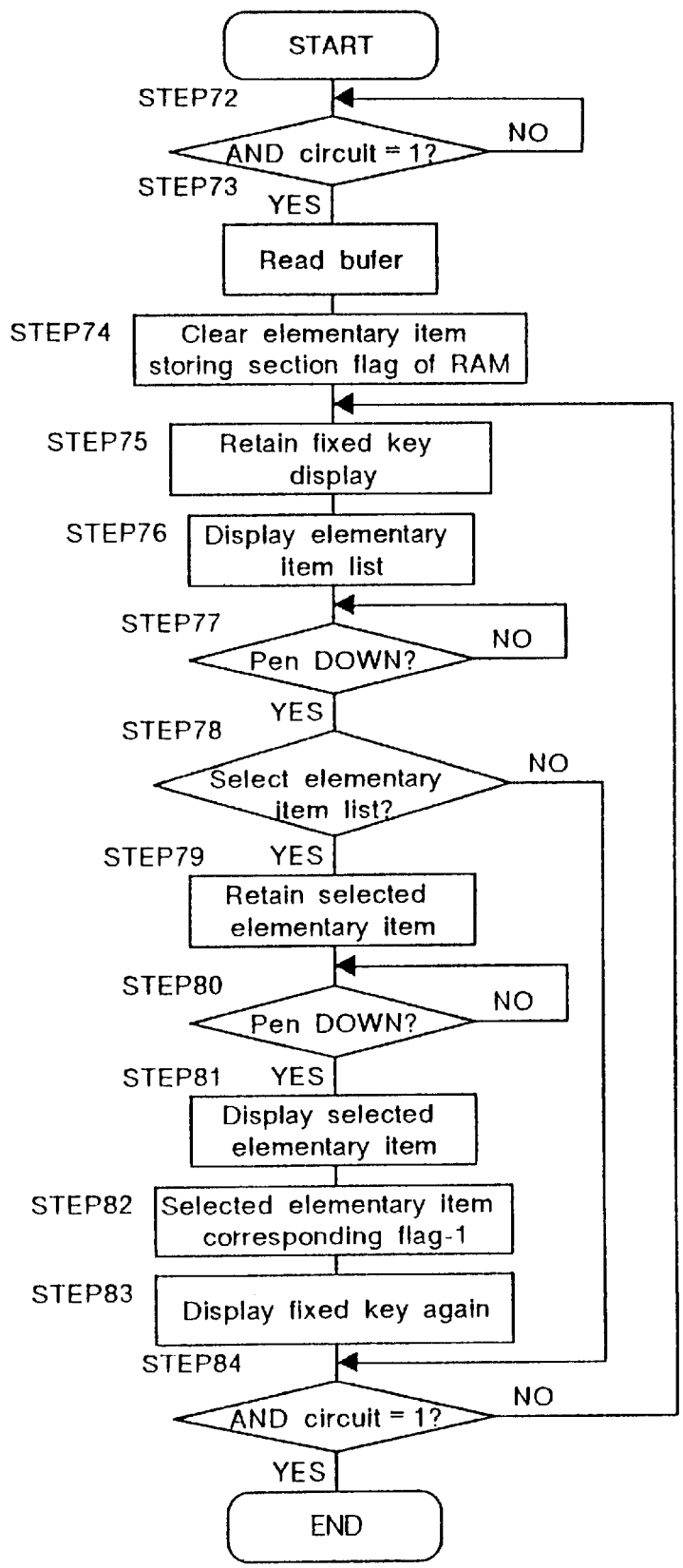
FIG. 23 is a flowchart showing procedure for displaying and selecting the elementary items of the schedule according to the present invention.
Figure 24:
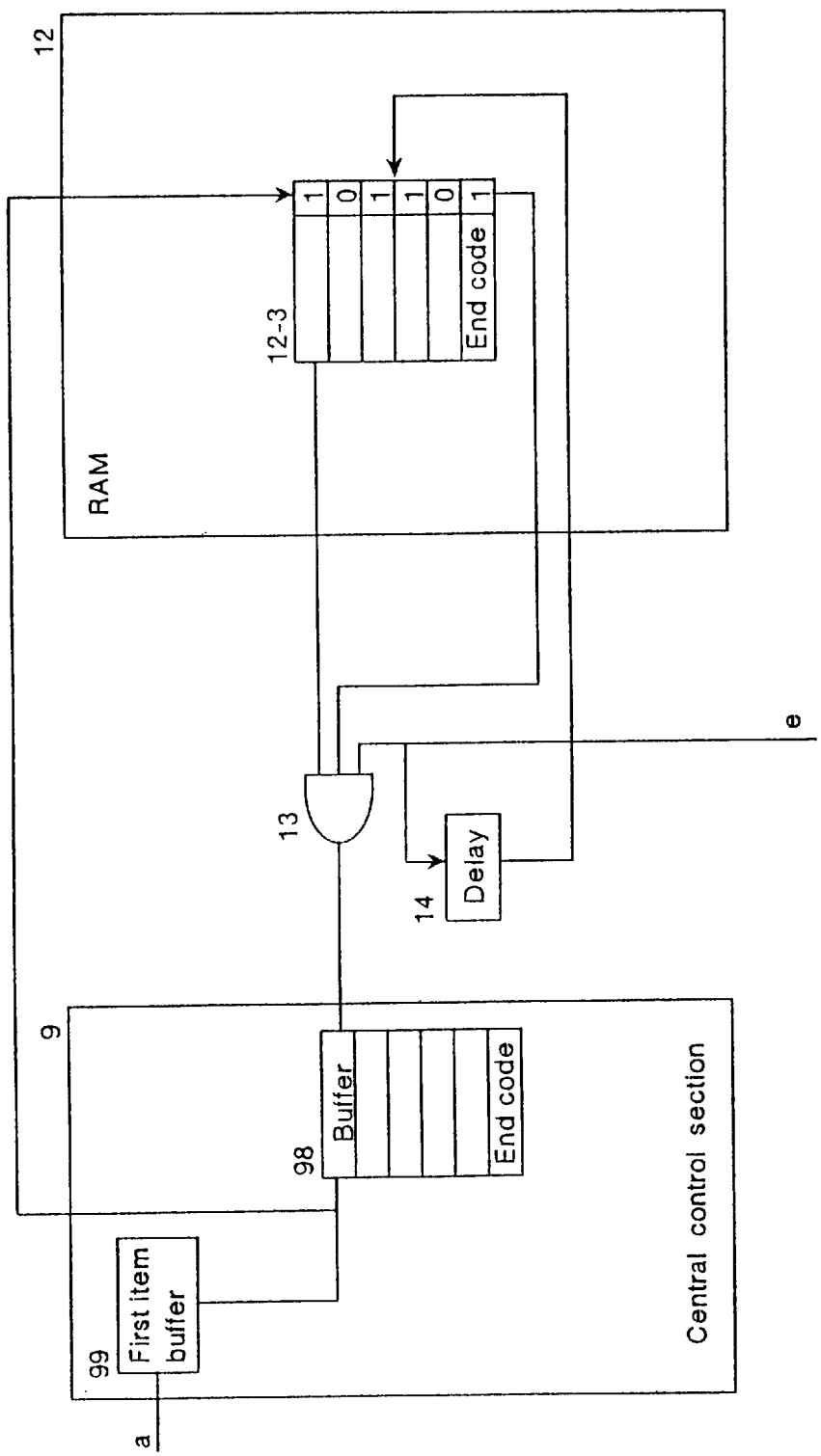
FIG. 24 is a detailed block diagram showing structures of the central control section and a RAM according to the present invention.

The above-mentioned processings will be described below in detail with reference to FIGS. 23 and 24.

At STEP 72, it is first decided whether or not an output of an AND circuit 13 is "1". A signal "1" for character data transmission and a signal for flag transmission are always sent from the elementary item storing section 12-3 of the RAM 12 to the AND circuit 13. A signal "1" is sent as the signal for flag transmission as long as the flag does not have "0". Consequently, "1" is sent from an control line e of a day counter 103 so that the output of the AND circuit 13 is set to "1". In this case, the routine proceeds to STEP 73. If the output of the AND circuit 13 is "0", nothing is performed. At STEP 73, the contents of the elementary item storing section 12-3 are read out of the RAM 12 to a buffer of the central control section 9. At STEP 74, "0" is set to all the flag portions of the elementary item storing section 12-3 of the RAM 12 at a timing which is set a little later than that of STEP 72 by a delay circuit 14. At STEP 75, display of a fixed key 201 is retained in a fixed key display storing section 12-4 of the RAM 12. At STEP 76, the elementary item list 206 is displayed on the fixed key 201 as shown in FIG. 5 (*b*).

At STEP 77, it is decided whether or not a liquid crystal display section 2 is touched with a pen. If the liquid crystal display section 2 is touched with the pen, it is decided whether or not a position of pen touch is on the elementary item list 206 at STEP 78. If the elementary item list 206 is not touched with the pen, the routine proceeds to STEP 83. If the elementary item list 206 is touched with the pen, the selected elementary item schedule is retained in a selected elementary item storing section 12-5 of the RAM 12 at STEP 79. At STEP 80, a user is waited for to specify a position where the elementary item schedules are to be displayed. When the elementary item display position is specified, the selected elementary item schedule retained at STEP 79 is displayed in the specified position at STEP 81.

Then, "1" is set to the flag of the elementary item storing section 12-3 of the RAM 12 corresponding to the selected elementary item schedule at STEP 82. At STEP 83, the fixed key 201 is displayed again. At STEP 84, it is decided whether or not the AND circuit 13 is "1". If the AND circuit 13 is "0", the routine returns to STEP 75. If the AND circuit 13 is "1", a processing for one month has been completed. Processings on and after STEP 72 are executed as processings for the next month.

While the user specifies the display position after selecting the displayed elementary items, the display position may be specified when the elementary item list is displayed.

By the above-mentioned processings, the elementary items of the schedules which have not been selected before performing a next month update and detection processing are deleted from the elementary item storing section 12-3 of the RAM 12. When the next month update and detection processing is performed, only a list of the elementary items selected last month is displayed.

<Ninth Embodiment>

Referring to scheduling, for example, "Conference for projecting new products" on 16, "Regular arrangement" on 26, "Data update" on 31, "Payment of rent" on 25 and "Meeting for exchanging information" on 10 are registered as five elementary item schedules together with set days, respectively.

A user sets a day that elementary items which have not been inputted are urged to be inputted to a first day of the same week as the schedule set day or to a final day of a last week. Assuming that the day that the schedule is urged to be inputted is set to last Saturday, description will be given below.

An arithmetic section 911 of a central control section 9 calculates a date of a next week corresponding to the set day from a set day 912 and date information sent from control lines f to h.

First of all, the "Conference for projecting new products", the "Regular arrangement" and the "Meeting for exchanging information" are selected, on January 16, January 26 and January 10, from a list of the elementary item schedules displayed by the month update and detection processing according to the second embodiment or the like, respectively, and schedule data are inputted. Consequently, the respective selected days are updated and stored in areas of the selected days of a corresponding elementary item storing section 12-3.

when a current day is January 20 (Sat.), the unselected elementary item, that is, the "Payment of rent" is automatically displayed together with information about a set day, that is, "25".

Any of the month update and detection processings according to the second to fourth embodiments may be employed.

Figure 25:
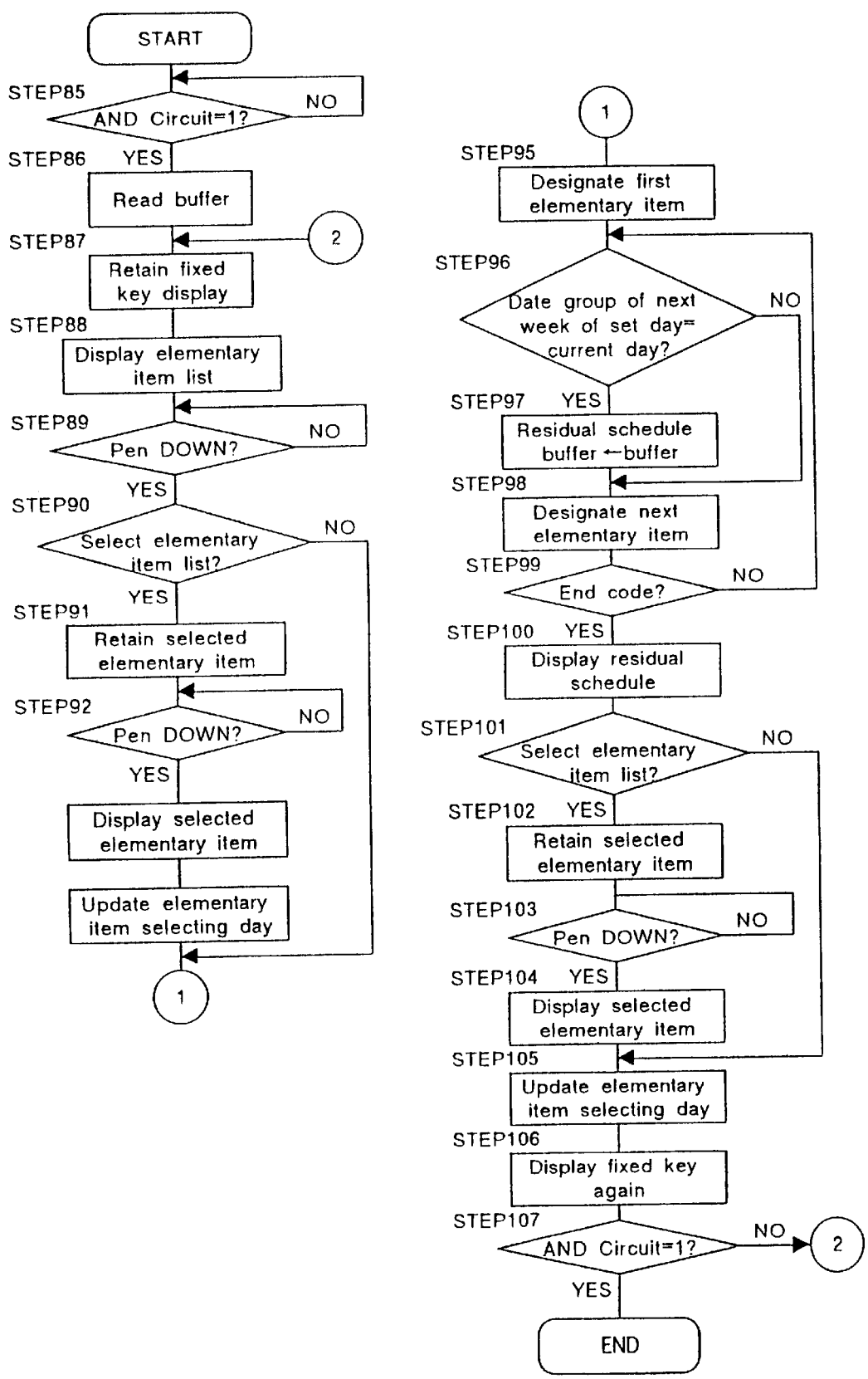
FIG. 25 is a flowchart showing the procedure for displaying and selecting the elementary items of the schedule according to the present invention.
Figure 26:
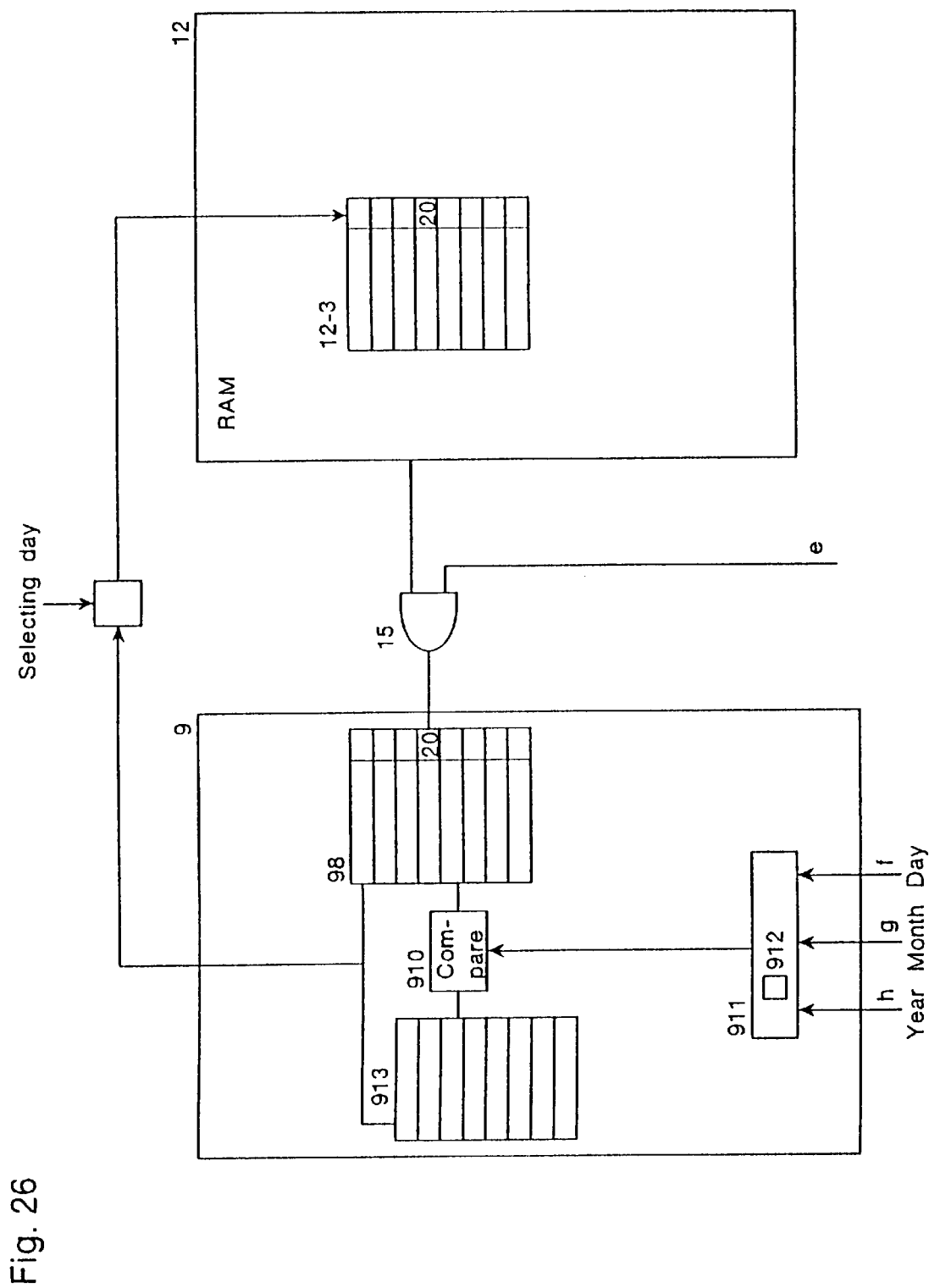
FIG. 26 is a detailed block diagram showing the structures of the central control section and the RAM according to the present invention.

The above-mentioned processings will be described below in detail with reference to FIGS. 25 and 26.

At STEP 85, it is first decided whether or not an output of an AND circuit 15 is "1". If the output of the AND circuit 15 is "1", the routine proceeds to STEP 86. If an output of the AND circuit 15 is "0", nothing is performed. At STEP 86, the elementary item schedule is read out of an RAM 12 to a buffer 98 of the central control section 9. At STEP 87, display of a fixed key 201 is retained in a fixed key display storing section 12-4 of the RAM 12. At STEP 88, an elementary item list 206 is displayed on the fixed key 201 as shown in FIG. 5 (b).

At STEP 89, it is decided whether or not an input/output section 2 is touched with a pen. If the input-output section 2 is touched with the pen, it is decided whether or not a position of pen touch is on the elementary item list 206 at STEP 90. If the elementary item list 206 is not touched with the pen, the routine proceeds to STEP 95. If the elementary item list 206 is touched with the pen, the routine proceeds to STEP 91 where the selected elementary item schedule is retained in a selected elementary item storing section 12-5 of the RAM 12. At STEP 92, the user is waited for to specify a position where the elementary item schedule is to be displayed. If the position where the elementary item schedule is to be displayed is specified, the selected elementary item schedule retained at STEP 91 is displayed in the specified position at STEP 93. The elementary item schedules which have been selected and displayed are deleted from the buffer 98 of the central control section 9 (Since this processing is the same as in the seventh embodiment, its description will be omitted). At STEP 94, a selected date is updated and stored in the elementary item storing section 12-3 of the RAM 12 corresponding to the elementary item selected at STEP 90.

At STEP 95, a first elementary item schedule of the buffer 98 of the central control section 9 is designated. At STEP 96, the arithmetic section 911 compares a current day with a group of days of the next week calculated from the set day 912. If the days are different from each other, the routine proceeds to STEP 98. If the current day is identical to one of the group of days of the next week calculated from the set day 912 by the arithmetic section 911, the designated elementary item is written to a residual schedule buffer 913 at STEP 97. In a processing of writing data from the buffer 98 of the central control section 9 to the residual schedule buffer 913, a form shown in FIG. 19 (b) according to the seventh embodiment is selected by the central control section 9. In the same manner as the processings of STEP 67 to STEP 70 shown in FIG. 20, the elementary item schedule is written and is simultaneously deleted from the buffer 98 together with the corresponding set day. Furthermore, a next elementary item schedule is designated at STEP 98. At STEP 99, it is decided whether or not the contents of the designated elementary item are end code. Processings of STEP 96 to STEP 99 are repeated until the end code is detected. At STEP 100, the contents of the residual schedule buffer 913 are displayed on a screen.

At STEP 101, it is decided whether or not a position of pen touch is on the elementary item list. If the elementary item list is not touched with the pen, the routine proceeds to STEP 106. If the elementary item list is touched with the pen, the routine proceeds to STEP 102 where the selected elementary item schedule is retained in the selected elementary item storing section 12-5 of the RAM 12. At STEP 103, the user is waited for to specify a position where the elementary item schedule is to be displayed. If the position where the elementary item schedule is to be displayed is specified, the selected elementary item schedule retained at STEP 102 is displayed in the specified position at STEP 104. The elementary item schedules which have been selected and displayed are deleted from the residual schedule buffer 913 of the central control section 9. At STEP 105, a selected date is updated and stored in the elementary item storing section 12-3 of the RAM 12 corresponding to the elementary item schedule selected at STEP 101. At STEP 106, the fixed key 201 is displayed again.

By the processings of STEP 95 to STEP 105, only the unselected elementary items whose last set days are in the next week based on the current day are displayed on the fixed key 201.

At STEP 107, it is decided whether or not an output of an AND circuit 121 is "1". If the output of the AND circuit 121 is "0", the routine returns to STEP 87. If the output of the AND circuit 121 is "1", a processing for one month has been completed. Processings on and after STEP 85 are executed as processings for a next month.

While the user specifies the display position after selecting the displayed elementary item, the display position may be specified when the elementary item list is displayed.

By the above-mentioned processings, the unselected elementary item schedules can be displayed again on the first day of the same week as that of the last set day or the final day of the last week to urge to input the elementary item schedules which have not been inputted.

<Tenth Embodiment>

Referring to scheduling, for example, "Conference for projecting new products", "Regular arrangement", "Data update", "Payment of rent" and "Meeting for exchanging information" are registered as five elementary item schedules in January, respectively. When January passes and February 1 comes, a group of elementary item schedules is sent from an elementary item storing section 12-3 of a RAM 12 to a buffer 98 of a central control section 9. At this time, a list of the five elementary item schedules registered last month is selectively displayed.

If the "Conference for projecting new products" is selected, the contents of the elementary item storing section 12-3 are sent to the buffer 98 and all the contents of the elementary item storing section 12-3 are then cleared. The selected "Conference for projecting new products" is newly registered in the elementary item storing section 12-3. Similarly, if the "Regular arrangement" and the "Meeting for exchanging information" are selected from the elementary item list, the contents of the elementary item storing section 12-3 are changed to the three selected elementary items. By these processings, an elementary item list for a next month is displayed such that an elementary item list 209 can be selected as shown in FIG. 27. A user can input only the regular schedules inputted last month.

Any of the month update and detection processings according to the second to fourth embodiments may be employed.

Figure 28:
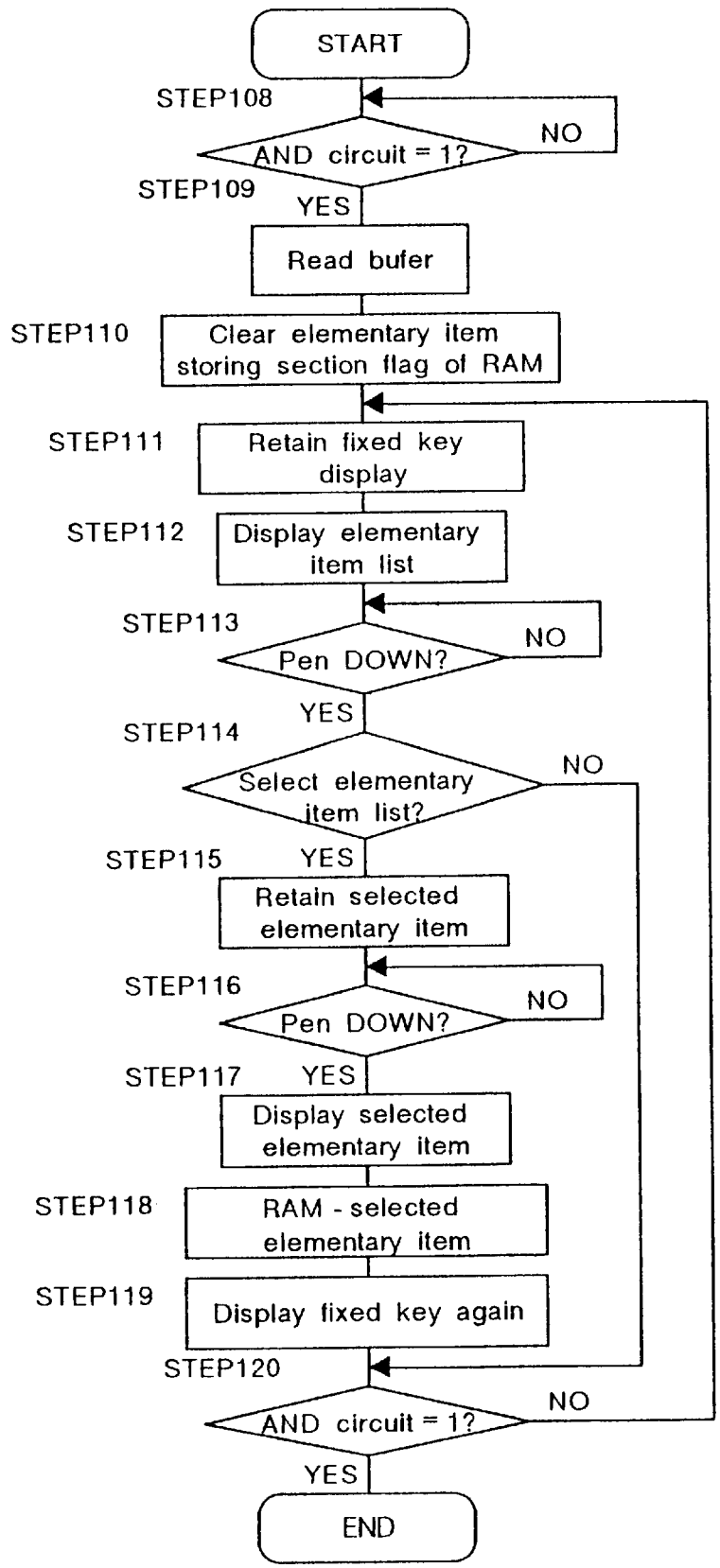
FIG. 28 is a flowchart showing the procedure for displaying and selecting the elementary items of the schedule according to the present invention.
Figure 29:
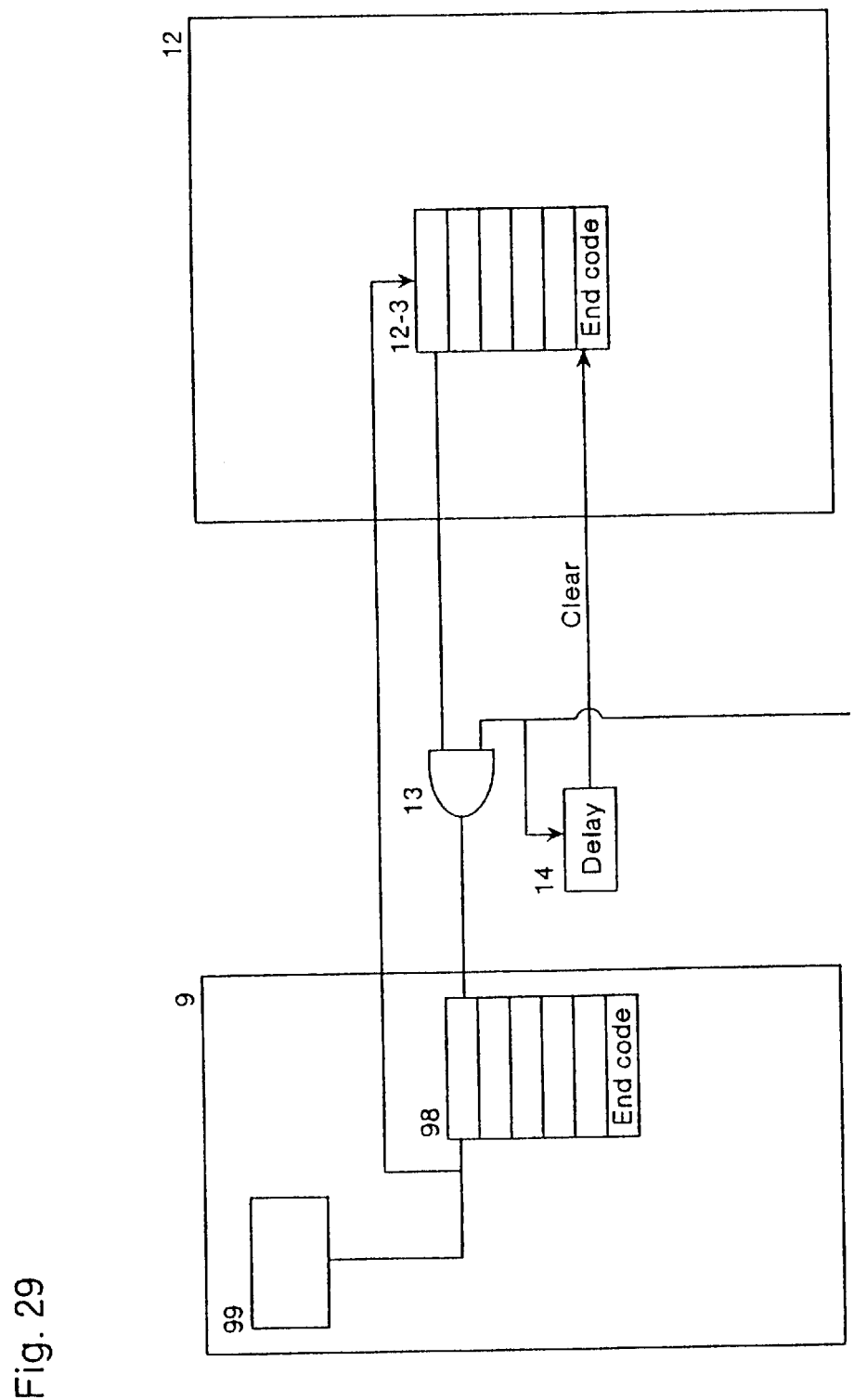
FIG. 29 is a detailed block diagram showing the structures of the central control section and the RAM according to the present invention.

The above-mentioned processings will be described below in detail with reference to FIGS. 28 and 29.

At STEP 108, it is first decided whether or not an output of an AND circuit 13 is "1". A signal "1" for character data transmission is always sent from the elementary item storing section 12-3 of the RAM 12 to the AND circuit 13. Consequently, "1" is sent from a control line e of a day counter 103 so that an output of the AND circuit 13 is set to "1". If the output of the AND circuit 13 is "1", the routine proceeds to STEP 109. If the output of the AND circuit 13 is "0", nothing is performed. At STEP 109, the contents of the elementary item storing section 12-3 are read out of the RAM 12 to the buffer of the central control section 9. At STEP 110, the contents of the elementary item storing section 12-3 of the RAM 12 are cleared at a timing which is set a little later than that of STEP 104 by a delay circuit 14. At STEP 111, display of a fixed key 201 is retained in a fixed key display storing section 12-4 of the RAM 12. At STEP 112, an elementary item list 206 is displayed on the fixed key 201 as shown in FIG. 5 (b).

At STEP 113, it is decided whether or not an input-output section 2 is touched with a pen. If the inputoutput section 2 is touched with the pen, it is decided whether or not a position of pen touch is on the elementary item list 206 at STEP 114. If the elementary item list 206 is not touched with the pen, the routine proceeds to STEP 120. If the elementary item list 206 is touched with the pen, the selected elementary item is retained in the selected elementary item storing section 12-5 of the RAM 12 at STEP 115. At STEP 116, a user is waited for to specify a position where the elementary item schedule is to be displayed. When the elementary item display position is specified, the selected elementary item schedule retained at STEP 115 is displayed in the specified position at STEP 117. At STEP 118, the selected elementary item schedule is retained in the elementary item storing section 12-3 of the RAM 12. At STEP 119, the fixed key 201 is displayed again.

At STEP 120, it is decided whether or not the output of the AND circuit 13 is "0". If the output of the AND circuit 13 is "0", the routine returns to STEP 110. If the output of the AND circuit 13 is "1", a processing for one month has been completed. Processings on and after STEP 108 are executed as processings for the next month.

While the user specifies the display position after selecting the displayed elementary items, the display position may be specified when the elementary item list is displayed.

By the above-mentioned processings, the elementary item schedules which have not been selected before performing a next month update and detection processing are deleted from the elementary item storing section 12-3 of the RAM 12. When the next month update and detection processing is performed, a list of the elementary items selected last month is displayed.

The present invention has the following effects.

(1) An information processor can be provided wherein a list of regular schedules for each month is automatically displayed at beginning of a month so that a user can be prevented from forgetting to input the regular schedules even if the user is not conscious of inputting the regular schedules.

(2) An information processor can be provided wherein the list of regular schedules for each month is automatically displayed on a specific day determined by the user so that the user can be prevented from forgetting to input the regular schedules even if the user is not conscious of inputting the regular schedules.

(3) An information processor can be provided wherein the regular schedules are automatically displayed when a power source is turned ON at the beginning of a month or on the specific day, for example, so that the user can be prevented from forgetting to input the regular schedules.

(4) An information processor can be provided wherein the regular schedules are automatically displayed when a schedule mode is selected at the beginning of a month or on the specific day so that the user can be prevented from forgetting to input the regular schedules.

(5) An information processor can be provided wherein the elementary items of the schedules which have already been selected are excluded to decrease the number of the elementary items of the schedules to be selected so that the user can easily input the elementary items of the schedules to be needed.

(6) An information processor can be provided wherein the items of the schedules which have not been selected before detecting beginning of a next month, a specific day or the like are deleted from the elementary items to decrease the number of the items to be inputted so that the user can easily input the elementary items of the schedules to be needed.

(7) An information processor can be provided wherein the unselected elementary items are displayed again on a first day of the same week as a past set day or a final day of a last week so that the schedules which have not been determined can be inputted and the user can be prevented from forgetting input.

(8) An information processor can be provided wherein the items of the schedules which have not been selected before detecting the beginning of the next month, the specific day or the like are deleted from the elementary items to decrease the number of the items to be inputted so that the user can easily input the elementary items of the schedules to be needed.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What is claimed is:

1. An information processor having a scheduling function, comprising:
    input means for inputting activation of the scheduling function and scheduling information;
    storing means for storing elementary item schedules;
    timing means for generating time and date information;
    detecting means for detecting a predetermined period based on the time and the date information generated by the timing means;
    display means for automatically displaying a list of the elementary item schedules stored by the storing means at every predetermined period detected by the detecting means; and
    selecting means for selecting a desired schedule from the list of the elementary item schedules displayed by the display means.

2. The information processor as defined in claim 1, further comprising:
    setting means for setting a specific day;
    comparing means for comparing with the specific day set by the setting means the date information generated by the timing means; and
    display control means for receiving, from the comparing means, a result of comparison in which the date information is coincident with the specific day, and for controlling the display means so that the list of the elementary item schedules stored by the storing means is displayed so as to be selected.

3. The information processor as defined in claim 2, further comprising power switching means for turning ON and OFF a power source, wherein the display control means further has a function of controlling the display means so that the list of the elementary item schedules stored by the storing means is displayed so as to be selected in response to power-ON performed by the power switching means.

4. The information processor as defined in claim 2, wherein the display control means further has a function of controlling the display means so that the list of the elementary item schedules stored by the storing means is displayed so as to be selected in response to activation of the scheduling function by the input means.

5. The information processor as defined in claim 2, further comprising:

temporary storing means for temporarily storing the elementary item schedules stored by the storing means; and deleting means for deleting an elementary item schedule selected by the selecting means from the temporary storing means, wherein the display control means further has a function of controlling the display means so that the list of elementary item schedules remaining in the temporary storing means is displayed so as to be selected.

6. The information processor as defined in claim 5, wherein the deleting means further has a function of deleting, from the storing means, an elementary item schedule which has not been selected by the selecting means.

7. The information processor as defined in claim 2, wherein the display control means further has a function of controlling, on the display means so that an elementary item schedule which has not been selected by the selecting means is displayed on a first day of the same week as the set specific day, or a final day of the week before.

8. The information processor as defined in claim 1, further comprising registering means for registering, in the storing means, an elementary item schedule selected by the selecting means.

\* \* \* \* \*